United States Patent
Fripp et al.

(10) Patent No.: US 11,639,766 B2
(45) Date of Patent: May 2, 2023

(54) EXPANDABLE METAL SLEEVES IN HIGH-RISK SECTIONS OF FLUID LINES

(71) Applicant: Halliburton Energy Services, Inc., Houston, TX (US)

(72) Inventors: Michael Linley Fripp, Carrollton, TX (US); Shanu Thottungal Eldho, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/462,307

(22) Filed: Aug. 31, 2021

(65) Prior Publication Data
US 2023/0063971 A1 Mar. 2, 2023
US 2023/0063971 A1 Mar. 2, 2023

(51) Int. Cl.
*F16L 55/163* (2006.01)

(52) U.S. Cl.
CPC .................. *F16L 55/163* (2013.01)

(58) Field of Classification Search
CPC .... E21B 33/134; E21B 33/12; E21B 33/1212; E21B 23/06; F16L 55/163
USPC ......................... 138/97–98; 405/184.2, 150.1
See application file for complete search history.

(56) References Cited

U.S. PATENT DOCUMENTS

| | | | | |
|---|---|---|---|---|
| 5,035,539 A | * | 7/1991 | Kawafuji | F16L 55/163 405/184.2 |
| 10,961,804 B1 | * | 3/2021 | Fripp | E21B 33/1208 |
| 2016/0137912 A1 | | 5/2016 | Sherman et al. | |
| 2016/0138359 A1 | * | 5/2016 | Zhao | F16J 15/068 277/316 |
| 2018/0087350 A1 | | 3/2018 | Sherman | |
| 2020/0080401 A1 | | 3/2020 | Sherman | |
| 2020/0362224 A1 | * | 11/2020 | Wellhoefer | C09K 8/5086 |
| 2020/0370391 A1 | * | 11/2020 | Fripp | E21B 33/1277 |
| 2021/0017835 A1 | * | 1/2021 | Pelto | E21B 33/1208 |
| 2021/0123319 A1 | * | 4/2021 | Greci | E21B 17/206 |

FOREIGN PATENT DOCUMENTS

| | | |
|---|---|---|
| CN | 108194756 | 8/2020 |
| JP | 2015175449 | 10/2015 |
| WO | 2014193042 | 12/2014 |

* cited by examiner

*Primary Examiner* — Patrick F Brinson
(74) *Attorney, Agent, or Firm* — Scott Richardson; Parker Justiss, P.C.

(57) ABSTRACT

Provided is a patch for a fluid line, a system employing a fluid line, and a method for sealing a fluid line. The fluid line, in one aspect, includes a tubular, and a sleeve of expandable metal positioned about the tubular, the sleeve of expandable metal comprising a metal configured to expand in response to hydrolysis and thereby seal a leaking section of a fluid line.

24 Claims, 26 Drawing Sheets

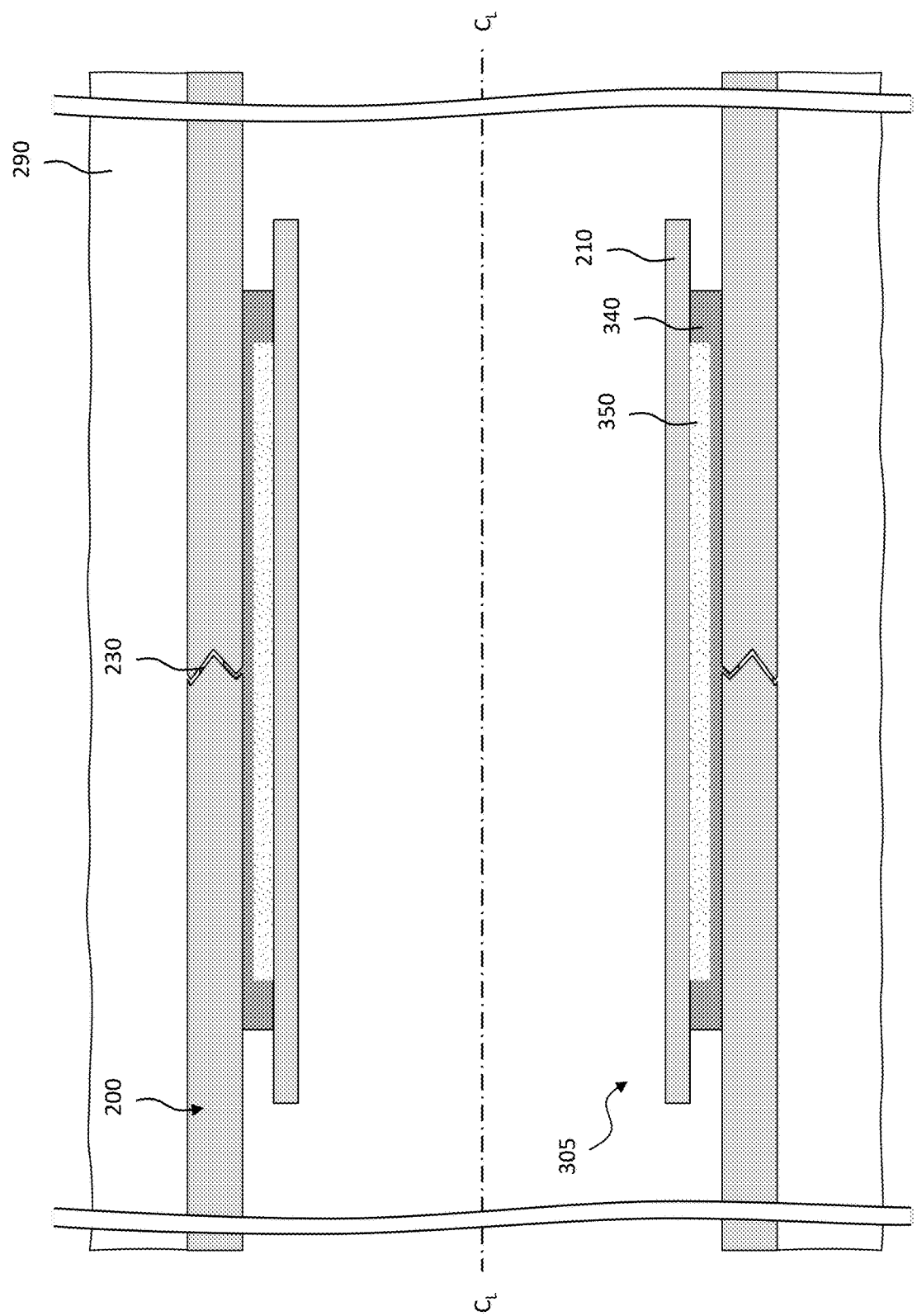

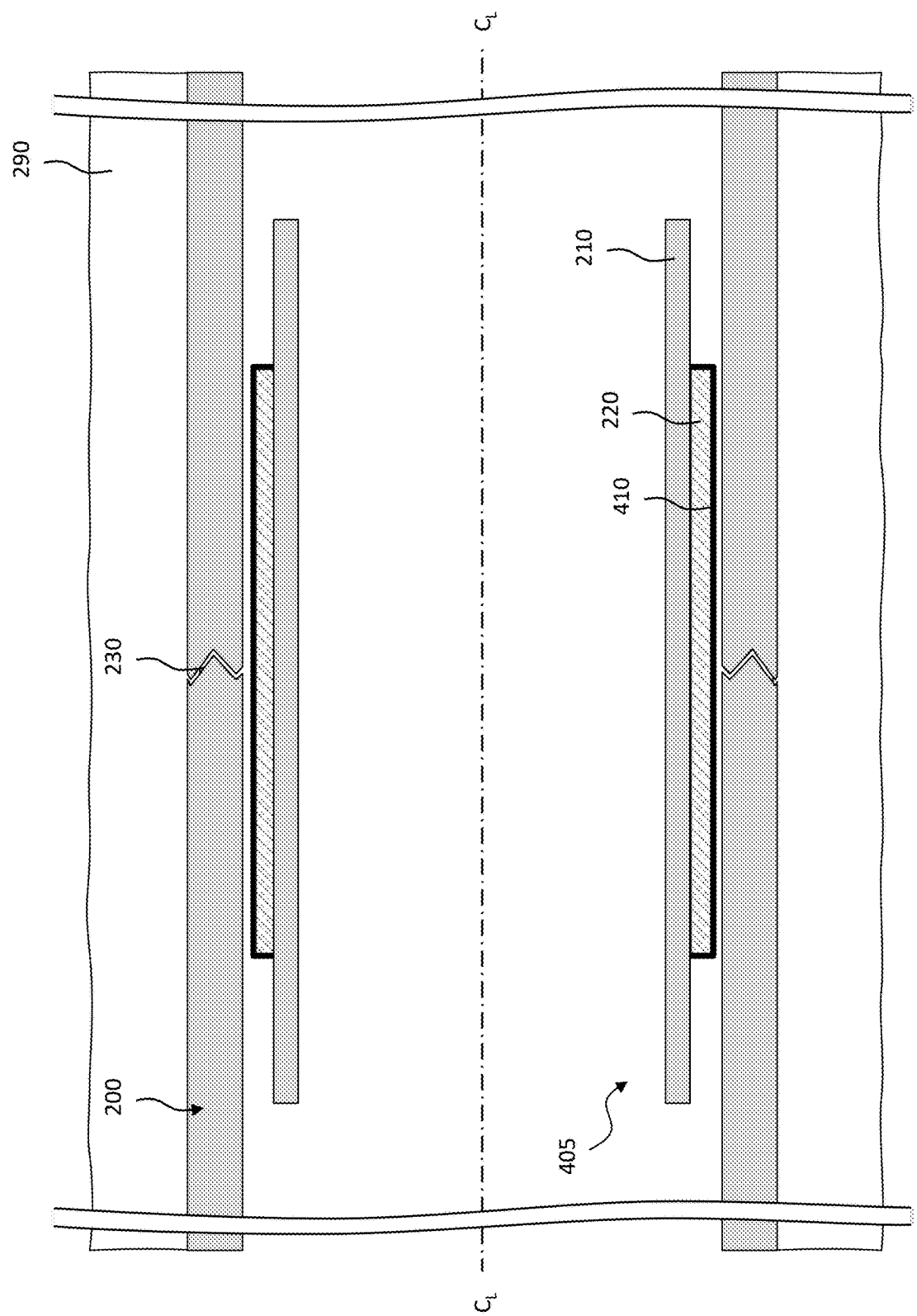

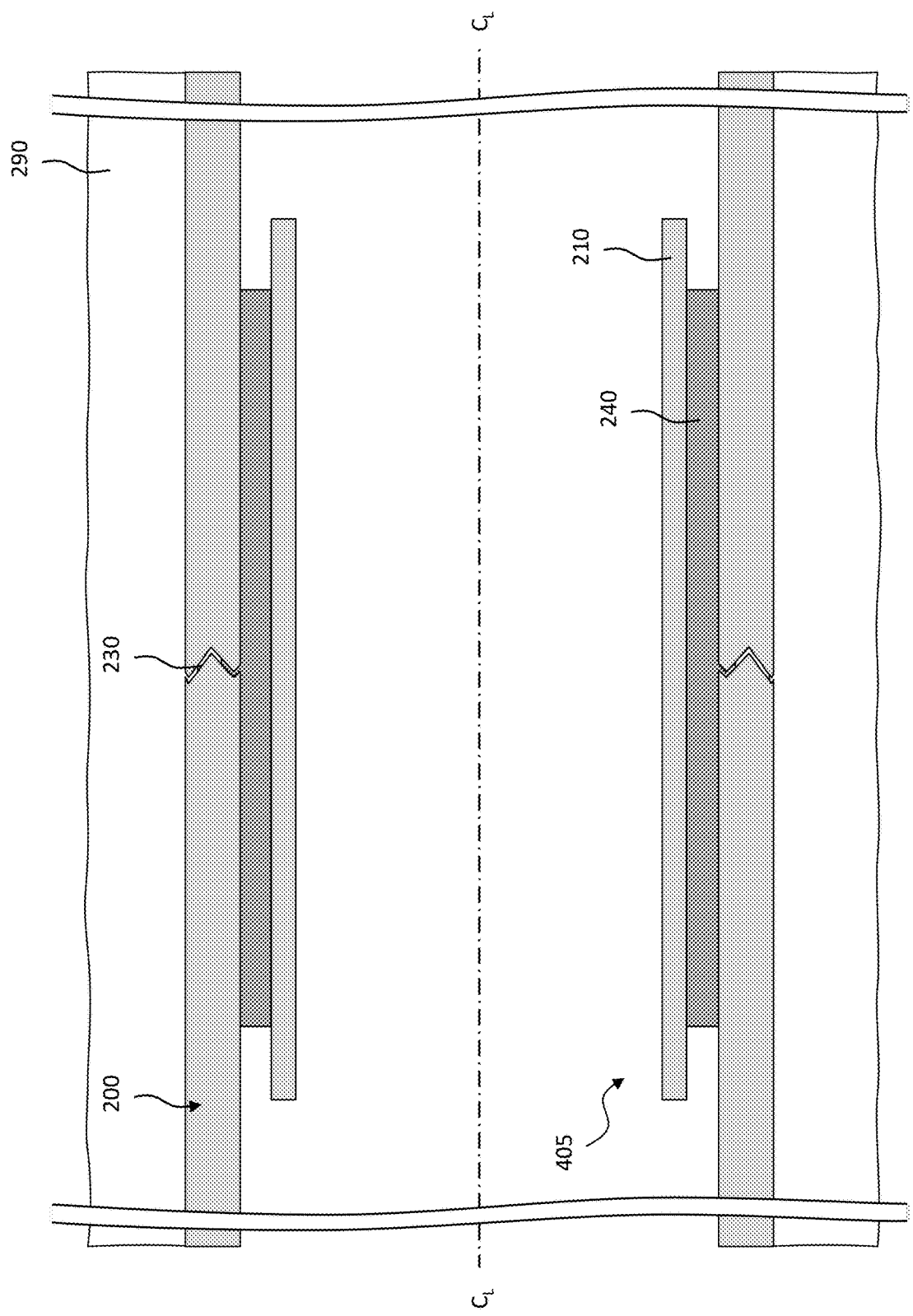

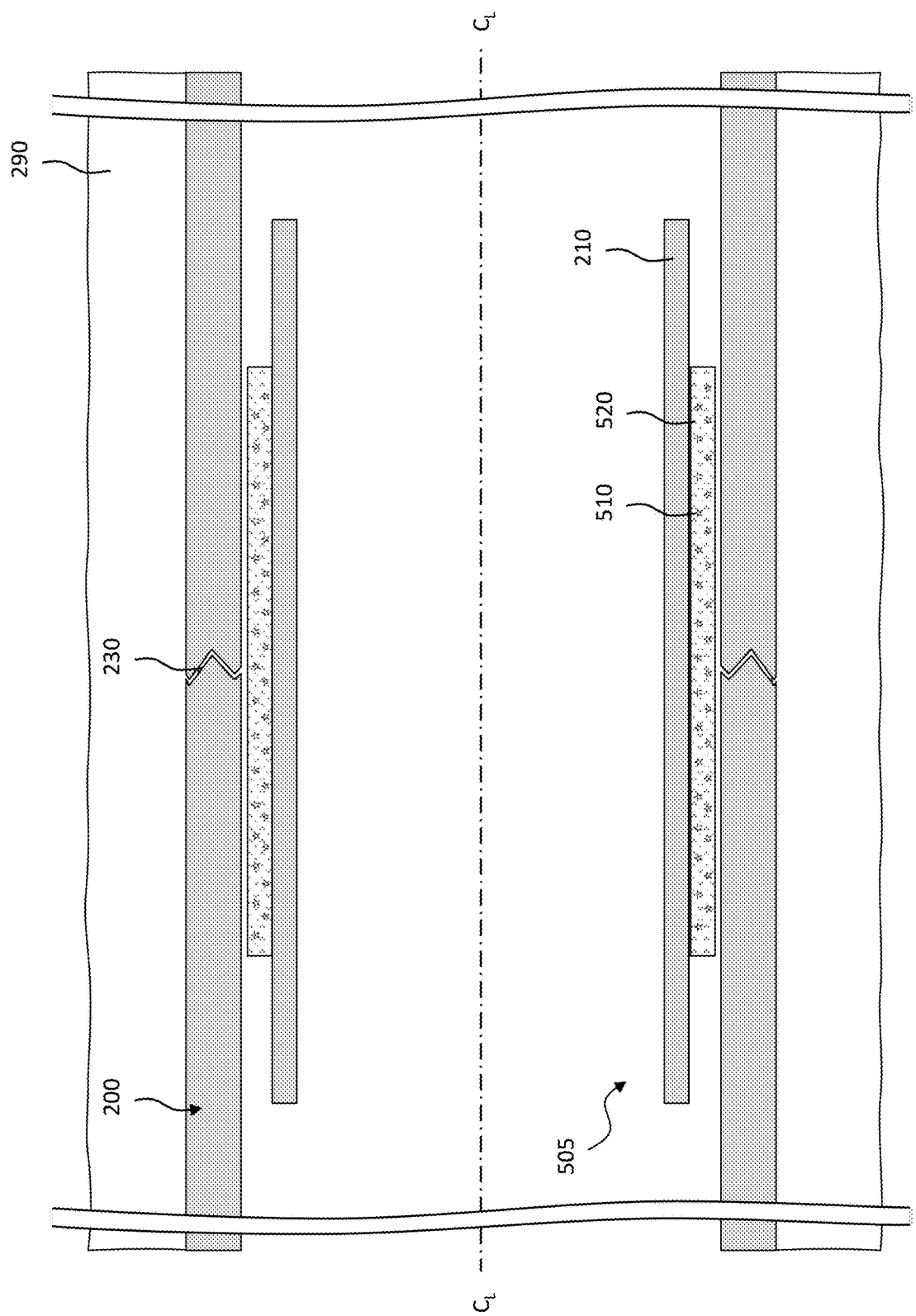

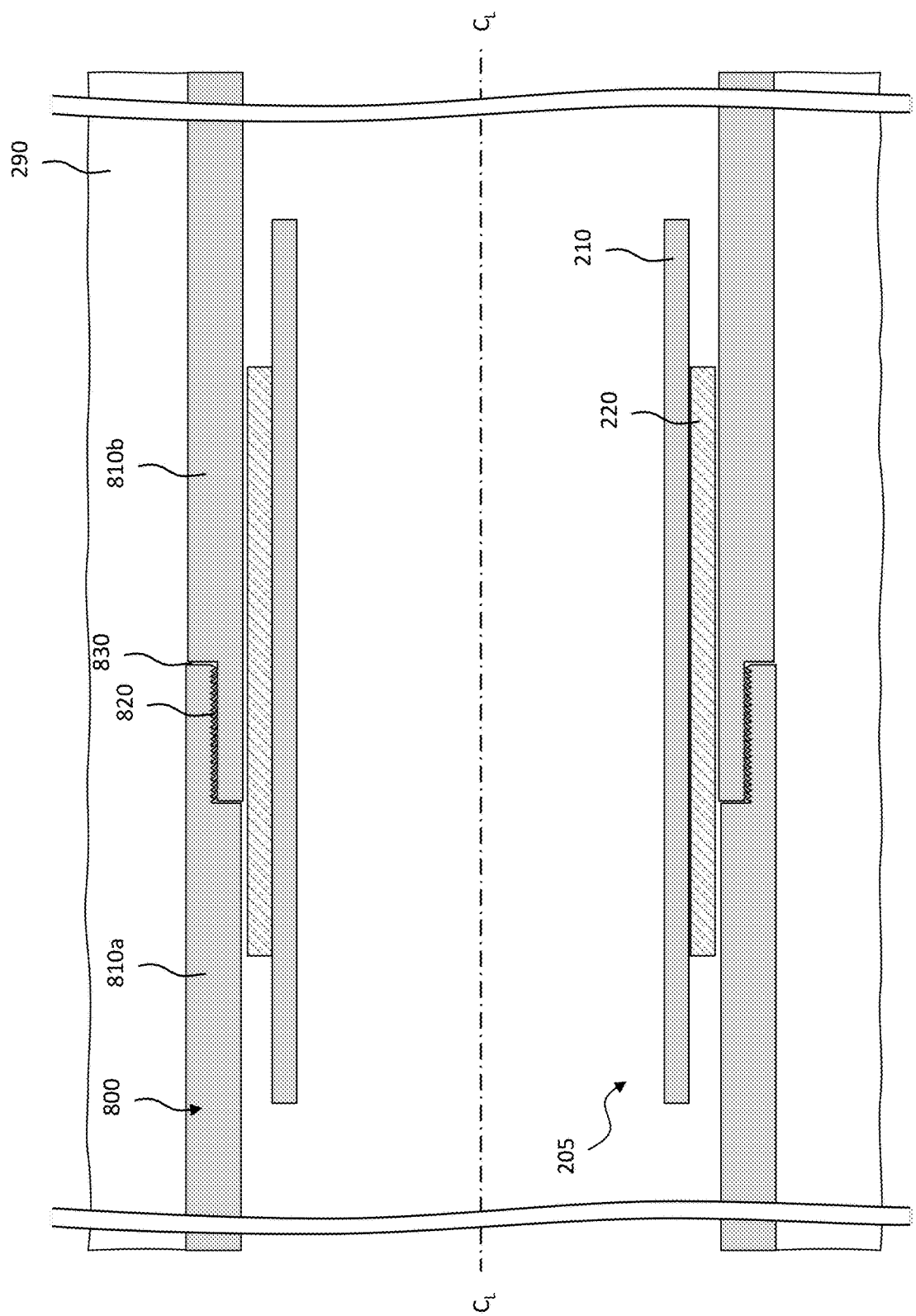

EXPANDABLE METAL SLEEVES IN HIGH-RISK SECTIONS OF FLUID LINES

BACKGROUND

Fluid lines are used for a plurality of different applications, including transporting one or more fluids from point A to point B. In certain instances, the distance from point A to point B is hundreds of meters or more. In yet other instances, the distance from point A to point B is less than a hundred meters, or even tens of meters or less. Nevertheless, regardless of length, fluid lines are susceptible to leakage and/or breaking, particularly in cold weather and/or freezing conditions.

BRIEF DESCRIPTION

Reference is now made to the following descriptions taken in conjunction with the accompanying drawings, in which:

FIGS. 3A through 3C illustrate different deployment states for a fluid line including a patch designed, manufactured, and operated according to an alternative aspect of the disclosure;

FIGS. 4A through 4C illustrate different deployment states for a fluid line including a patch designed, manufactured, and operated according to an alternative aspect of the disclosure;

FIGS. 5A through 5C illustrate different deployment states for a fluid line including a patch designed, manufactured, and operated according to an alternative aspect of the disclosure;

DETAILED DESCRIPTION

Figure 1A:
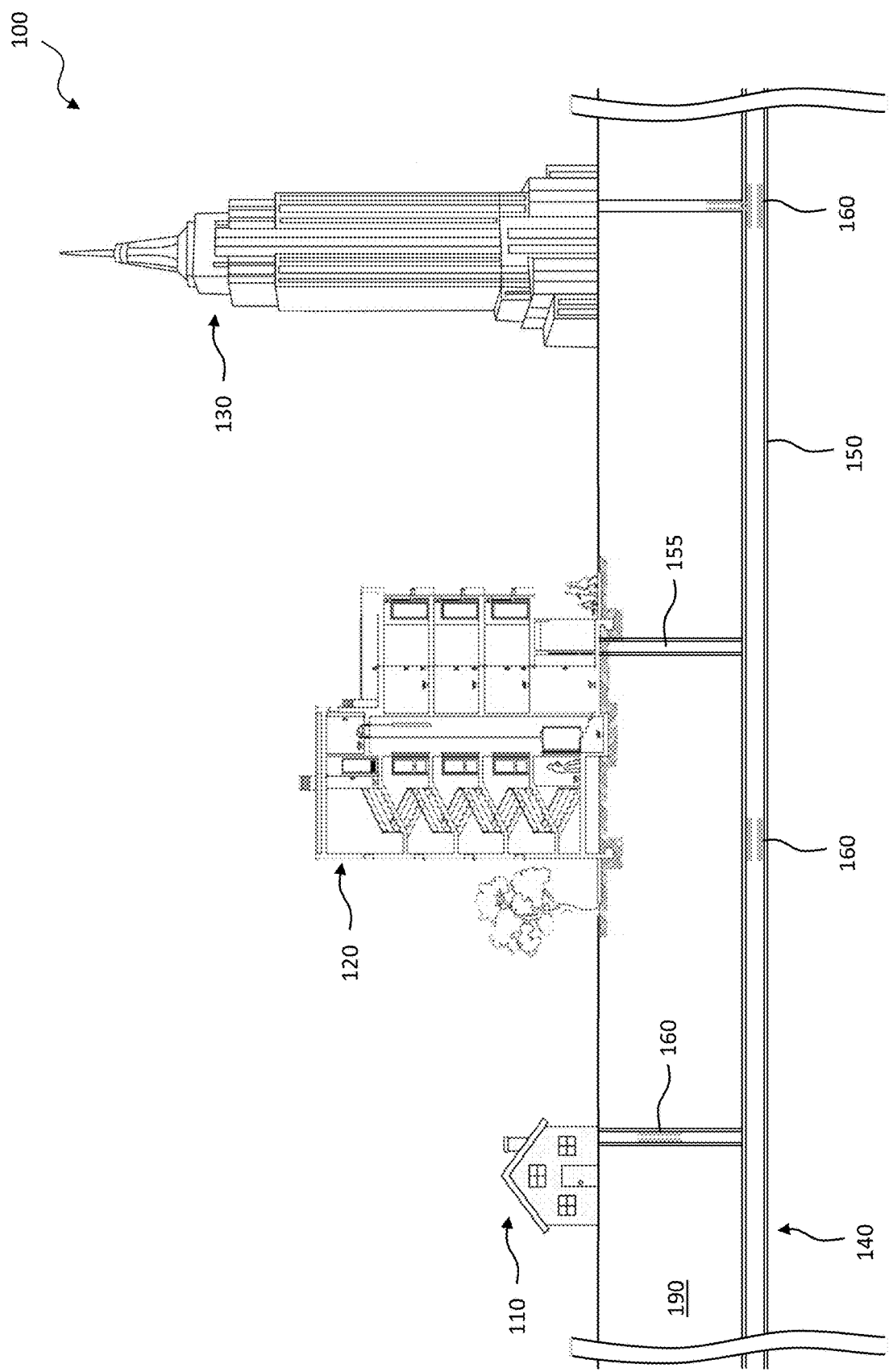
FIG. 1A illustrates a system designed, manufactured, and operated according to one or more embodiments of the disclosure.

In the drawings and descriptions that follow, like parts are typically marked throughout the specification and drawings with the same reference numerals, respectively. The drawn figures are not necessarily to scale. Certain features of the disclosure may be shown exaggerated in scale or in somewhat schematic form and some details of certain elements may not be shown in the interest of clarity and conciseness. The present disclosure may be implemented in embodiments of different forms.

Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described.

The present disclosure has acknowledged that today's fluid lines are subject to a variety of conditions that may cause them to crack, rupture or otherwise leak. Specifically, the present disclosure has acknowledged that the expansion and/or contraction of the fluid lines, particularly in harsh weather conditions such as freezing temperatures and/or extreme heat, may cause such expansion and/or contraction. The present disclosure has also acknowledged that a number of other different situations may cause leaks.

Based upon these acknowledgements, the present disclosure has recognized that such fluid lines typically have high-risk sections that have a higher degree of failure than other low-risk sections. For example, the present disclosure has recognized that junctions in the fluid lines, arced and/or angled sections of the fluid lines, sections of the fluid lines susceptible to high degrees of erosion, etc., are more likely to fail. Based upon these recognitions, the present disclosure has determined that it would be beneficial to position a patch including a sleeve of expandable metal in the fluid line at one or more of those sections likely to fail, the expandable metal sleeve configured to expand in response to hydrolysis and seal the failed section of the fluid lines (e.g., from within the fluid line). In certain instances, the patch is positioned in the fluid line prior to a leak forming, for example at those locations of the fluid line likely to fail. In other instances, the patch is positioned in the fluid line at a location of a known or suspected leak, again to seal the failed section of the fluid line. In either instance, the patch and its sleeve of expandable metal either prevent a leak from being formed, or alternatively repair a leak that has formed.

FIG. 1A illustrates a system 100 designed, manufactured, and operated according to one or more embodiments of the disclosure. The system 100, in the illustrated embodiment, includes one or more homes 110, one or more multifamily residences 120, and/or one or more office buildings 130, all of which are placed over a surrounding medium 190 (e.g., the ground in one embodiment, fluid, such as fresh water or sea water, in another embodiment, etc.). In accordance with one embodiment of the disclosure, the system 100 includes one or more fluid lines 140, for example located in the surrounding medium 190, and providing fluid to and/or from one or more of the homes 110, multifamily residences 120 and/or office buildings 130. For example, in the embodiment of FIG. 1A, the one or more fluid lines 140 include a main fluid line 150, and one or more lateral fluid lines 155 extending from the main fluid line 150.

In at least one embodiment, the main fluid lines 150 and/or the lateral fluid lines 155 are fluid lines that might be found in a municipal fluid line system. For example, the main fluid lines 150 and/or lateral fluid lines 155 might be municipal freshwater fluid lines, or municipal wastewater fluid lines, among other. The fluid lines 140, in at least one embodiment, are located less than 150 meters (e.g., less than about 500 feet) below the surface of the ground and/or water. In at least one other embodiment, the fluid lines 140 are located less than 60 meters (e.g., less than about 200 feet)

below the surface of the ground and/or water, and in certain other embodiments are located from about 0.3 meters (e.g., about 1 foot) to about 30 meters (e.g., about 100 feet) below the surface of the ground and/or water.

In accordance with the disclosure, the one or more fluid lines 140 may each include a patch 160 located therein, for example in a high-risk section of the one or more fluid lines 140 susceptible to leaking, or alternatively in a section of the one or more fluid lines 140 that have already formed a leak. The patch 160, in one or more embodiments, may include a tubular, as well as a sleeve of expandable metal positioned about the tubular, the sleeve of expandable metal comprising a metal configured to expand in response to hydrolysis and thereby seal a leaking section of the fluid line 140. In at least one embodiment, such as that shown in FIG. 1A, the patch 160 is positioned within a section of the main fluid line 150, positioned within a section of the lateral fluid line(s) 155, or positioned within a junction between the main fluid line 150 and the lateral fluid line 155, among other locations. While not illustrated, the one or more fluid lines 140 and resulting patch 160 could also be located within one or more of the homes 110, multifamily residences 120 and/or office buildings 130, and thus not within the surrounding medium 190. Moreover, the one or more fluid lines 140 and resulting patch 160 designed, manufactured and used according to the disclosure, could be in many other configurations and/or locations (e.g., including within cement, or alternatively another tubular) and remain within the scope of the present disclosure, and thus are not limited to the homes 110, multifamily residences 120 and/or office buildings 130 illustrated in FIG. 1A.

As briefly indicated above, the sleeve of expandable metal (e.g., in at least on embodiment) automatically, and without intervention, expands in response to hydrolysis, thereby preventing the leak from occurring, or alternatively sealing the leak. Accordingly, what results are one or more expanded metal seals, or partially expanded metal seals surrounding and fixing the leak in the tubular. The term expandable metal, as used herein, refers to the expandable metal in a pre-expansion form. Similarly, the term expanded metal, as used herein, refers to the resulting expanded metal after the expandable metal has been subjected to reactive fluid, as discussed below. Additionally, the term partially expanded metal, as used herein, refers to the resulting expanded metal after a portion of the expandable metal has been subjected to reactive fluid, as discussed below.

The expanded metal, in accordance with one or more aspects of the disclosure, comprises a metal that has expanded in response to hydrolysis. In certain embodiments, the expanded metal includes residual unreacted metal, such as when it is partially expanded metal. For example, in certain embodiments the expanded metal is intentionally designed to include the residual unreacted metal. The residual unreacted metal has the benefit of allowing the expanded metal to self-heal if cracks or other anomalies subsequently arise, or for example to accommodate changes in the tubular or mandrel diameter due to variations in temperature and/or pressure. Nevertheless, other embodiments may exist wherein no residual unreacted metal exists in the expanded metal.

The expandable metal, in some embodiments, may be described as expanding to a cement like material. In other words, the expandable metal goes from metal to micron-scale particles and then these particles expand and lock together to, in essence, seal two or more surfaces together. The reaction may, in certain embodiments, occur in less than 2 days in a reactive fluid and in certain temperatures. Nevertheless, the time of reaction may vary depending on the reactive fluid, the expandable metal used, the downhole temperature, and surface-area-to-volume ratio (SA:V) of the expandable metal.

The reactive fluid, in one or more embodiments, is the fluid being transported with the fluid line. For example, in at least one embodiment, the reactive fluid is potable water. In at least one other embodiment, the reactive fluid is non-potable water, such as salt water (including brine and ocean water), contaminated water (including wastewater from oil and gas operations), sewage, steam, etc.

The expandable metal is electrically conductive in certain embodiments. The expandable metal, in certain embodiments, has a yield strength greater than about 8,000 psi, e.g., 8,000 psi+/−50%.

The hydrolysis of the expandable metal can create a metal hydroxide. The formative properties of alkaline earth metals (Mg—Magnesium, Ca—Calcium, etc.) and transition metals (Zn—Zinc, Al—Aluminum, etc.) under hydrolysis reactions demonstrate structural characteristics that are favorable for use with the present disclosure. Hydration results in an increase in size from the hydration reaction and results in a metal hydroxide that can precipitate from the fluid.

The hydration reactions for magnesium is:

$$Mg+2H_2O \rightarrow Mg(OH)_2+H_2,$$

where $Mg(OH)_2$ is also known as brucite. Another hydration reaction uses aluminum hydrolysis. The reaction forms a material known as Gibbsite, bayerite, boehmite, aluminum oxide, and norstrandite, depending on form. The possible hydration reactions for aluminum are:

$$Al+3H_2O \rightarrow Al(OH)_3+3/2H_2.$$

$$Al+2H_2O \rightarrow Al\ O(OH)+3/2H_2$$

$$Al+3/2H_2O \rightarrow \tfrac{1}{2}Al_2O_3+3/2H_2$$

Another hydration reaction uses calcium hydrolysis. The hydration reaction for calcium is:

$$Ca+2H_2O \rightarrow Ca(OH)_2+H_2,$$

Where $Ca(OH)_2$ is known as portlandite and is a common hydrolysis product of Portland cement. Magnesium hydroxide and calcium hydroxide are considered to be relatively insoluble in water. Aluminum hydroxide can be considered an amphoteric hydroxide, which has solubility in strong acids or in strong bases. Alkaline earth metals (e.g., Mg, Ca, etc.) work well for the expandable metal, but transition metals (Al, etc.) also work well for the expandable metal. In one embodiment, the metal hydroxide is dehydrated by the swell pressure to form a metal oxide.

In at least one embodiment, the expandable metal is a non-graphene based expandable metal. By non-graphene based material, it is meant that is does not contain graphene, graphite, graphene oxide, graphite oxide, graphite intercalation, or in certain embodiments, compounds and their derivatized forms to include a function group, e.g., including carboxy, epoxy, ether, ketone, amine, hydroxy, alkoxy, alkyl, aryl, aralkyl, alkaryl, lactone, functionalized polymeric or oligomeric groups, or a combination comprising at least one of the forgoing functional groups. In at least one other embodiment, the expandable metal does not include a matrix material or an exfoliatable graphene-based material. By not being exfoliatable, it is meant that the expandable metal is not able to undergo an exfoliation process. Exfoliation as used herein refers to the creation of individual sheets, planes, layers, laminae, etc. (generally, "layers") of a graphene-based material; the delamination of the layers; or the enlargement of a planar gap between adjacent ones of the layers, which in at least one embodiment the expandable metal is not capable of.

In yet another embodiment, the expandable metal does not include graphite intercalation compounds, wherein the graphite intercalation compounds include intercalating agents such as, for example, an acid, metal, binary alloy of an alkali metal with mercury or thallium, binary compound of an alkali metal with a Group V element (e.g., P, As, Sb, and Bi), metal chalcogenide (including metal oxides such as, for example, chromium trioxide, $PbO_2$, $MnO_2$, metal sulfides, and metal selenides), metal peroxide, metal hyperoxide, metal hydride, metal hydroxide, metals coordinated by nitrogenous compounds, aromatic hydrocarbons (benzene, toluene), aliphatic hydrocarbons (methane, ethane, ethylene, acetylene, n-hexane) and their oxygen derivatives, halogen, fluoride, metal halide, nitrogenous compound, inorganic compound (e.g., trithiazyl trichloride, thionyl chloride), organometallic compound, oxidizing compound (e.g., peroxide, permanganate ion, chlorite ion, chlorate ion, perchlorate ion, hypochlorite ion, $As_2O_5$, $N_2O_5$, $CH_3ClO_4$, $(NH_4)_2S_2O_8$, chromate ion, dichromate ion), solvent, or a combination comprising at least one of the foregoing. In yet another embodiment, the expandable metal does not swell by sorption.

In an embodiment, the expandable metal used can be a metal alloy. The expandable metal alloy can be an alloy of the base expandable metal with other elements in order to either adjust the strength of the expandable metal alloy, to adjust the reaction time of the expandable metal alloy, or to adjust the strength of the resulting metal hydroxide byproduct, among other adjustments. The expandable metal alloy can be alloyed with elements that enhance the strength of the metal such as, but not limited to, Al—Aluminum, Zn—Zinc, Mn—Manganese, Zr—Zirconium, Y—Yttrium, Nd—Neodymium, Gd—Gadolinium, Ag—Silver, Ca—Calcium, Sn—Tin, and Re—Rhenium, Cu—Copper. In some embodiments, the expandable metal alloy can be alloyed with a dopant that promotes corrosion, such as Ni—Nickel, Fe—Iron, Cu—Copper, Co—Cobalt, Ir—Iridium, Au—Gold, C—Carbon, Ga—Gallium, In—Indium, Mg—Mercury, Bi—Bismuth, Sn—Tin, and Pd—Palladium. The expandable metal alloy can be constructed in a solid solution process where the elements are combined with molten metal or metal alloy. Alternatively, the expandable metal alloy could be constructed with a powder metallurgy process. The expandable metal can be cast, forged, extruded, sintered, welded, mill machined, lathe machined, stamped, eroded or a combination thereof. The metal alloy can be a mixture of the metal and metal oxide. For example, a powder mixture of aluminum and aluminum oxide can be ball-milled together to increase the reaction rate.

Optionally, non-expanding components may be added to the starting metallic materials. For example, ceramic, elastomer, plastic, epoxy, glass, or non-reacting metal components can be embedded in the expandable metal or coated on the surface of the expandable metal. In yet other embodiments, the non-expanding components are metal fibers, a composite weave, a polymer ribbon, or ceramic granules, among others. Alternatively, the starting expandable metal may be the metal oxide. For example, calcium oxide (CaO) with water will produce calcium hydroxide in an energetic reaction. Due to the higher density of calcium oxide, this can have a 260% volumetric expansion (e.g., converting 1 mole of CaO may cause the volume to increase from 9.5 cc to 34.4 cc). In one variation, the expandable metal is formed in a serpentinite reaction, a hydration and metamorphic reaction.

In one variation, the resultant material resembles a mafic material. Additional ions can be added to the reaction, including silicate, sulfate, aluminate, carbonate, and phosphate. The metal can be alloyed to increase the reactivity or to control the formation of oxides.

The expandable metal can be configured in many different fashions, as long as an adequate volume of material is available for sealing the leak. For example, the expandable metal may be formed into a single long member, multiple short members, rings, among others. In another embodiment, the expandable metal may be formed into a long wire of expandable metal, that can be in turn be wound around a tubular as a sleeve. The wire diameters do not need to be of circular cross-section, but may be of any cross-section. For example, the cross-section of the wire could be oval, rectangle, star, hexagon, keystone, hollow braided, woven, twisted, among others, and remain within the scope of the disclosure. In certain other embodiments, the expandable metal is a collection of individual separate chunks of the metal held together with a binding agent. In yet other embodiments, the expandable metal is a collection of individual separate chunks of the metal that are not held together with a binding agent, but held in place using one or more different techniques.

Additionally, a delay coating may be applied to one or more portions of the expandable metal to delay the expanding reactions. In one embodiment, the material configured to delay the hydrolysis process is a fusible alloy. In another embodiment, the material configured to delay the hydrolysis process is a eutectic material. In yet another embodiment, the material configured to delay the hydrolysis process is a wax, oil, or other non-reactive material.

Figure 1B:
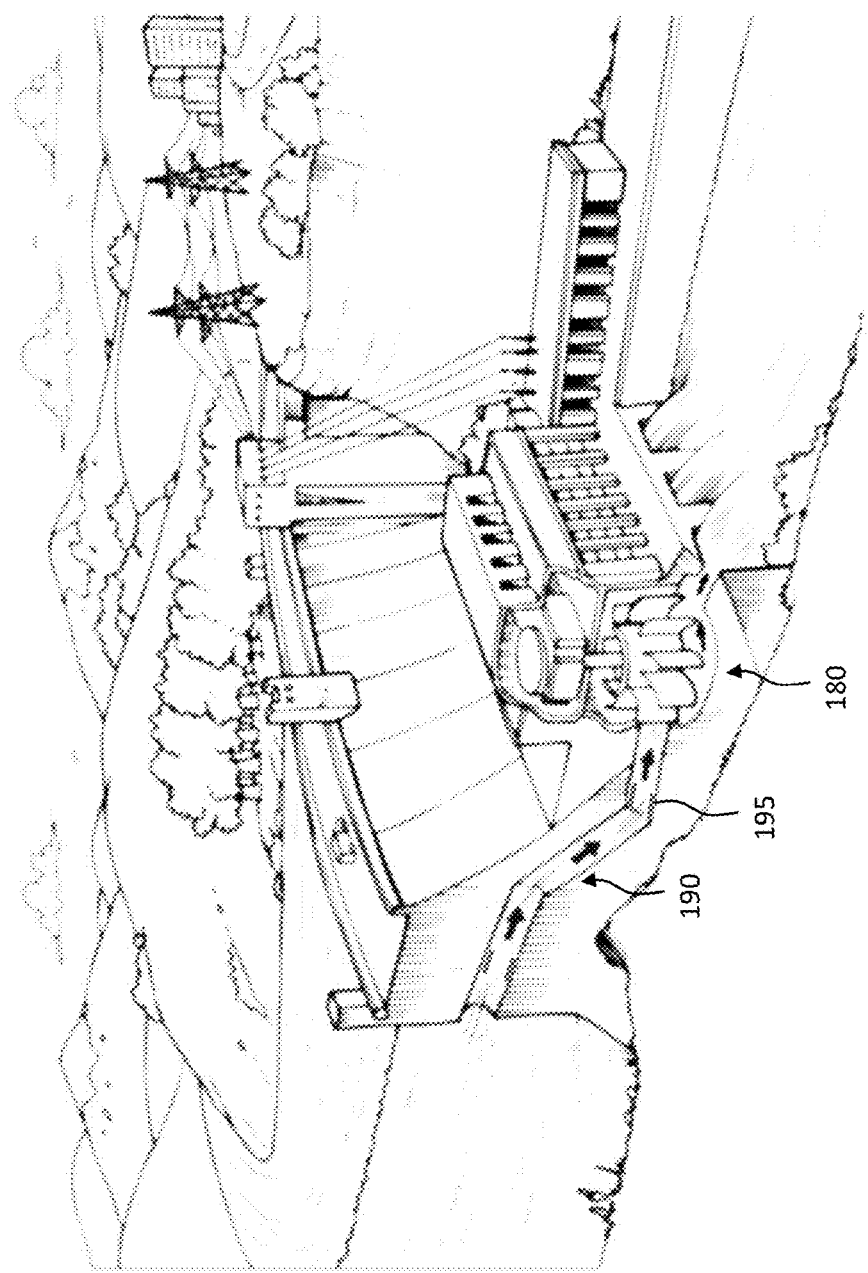
FIG. 1B illustrates a system designed, manufactured, and operated according to one or more alternative embodiments of the disclosure.

FIG. 1B illustrates a system 170 designed, manufactured, and operated according to one or more alternative embodiments of the disclosure. The system 170, in the illustrated embodiment, includes a power generation facility 180. While the power generation facility 180 illustrated in FIG. 1B is a hydroelectric power generation facility, other power generation facilities, including nuclear power generation facilities and others are within the scope of the present disclosure. In the illustrated embodiment, the power generation facility includes one or more fluid lines 190 having one or more patches 195 designed, manufactured and operated according to the present disclosure. The patches 195 illustrated in FIG. 1B may be similar in one or more respects to any of the patches discussed herein.

Figure 2A:
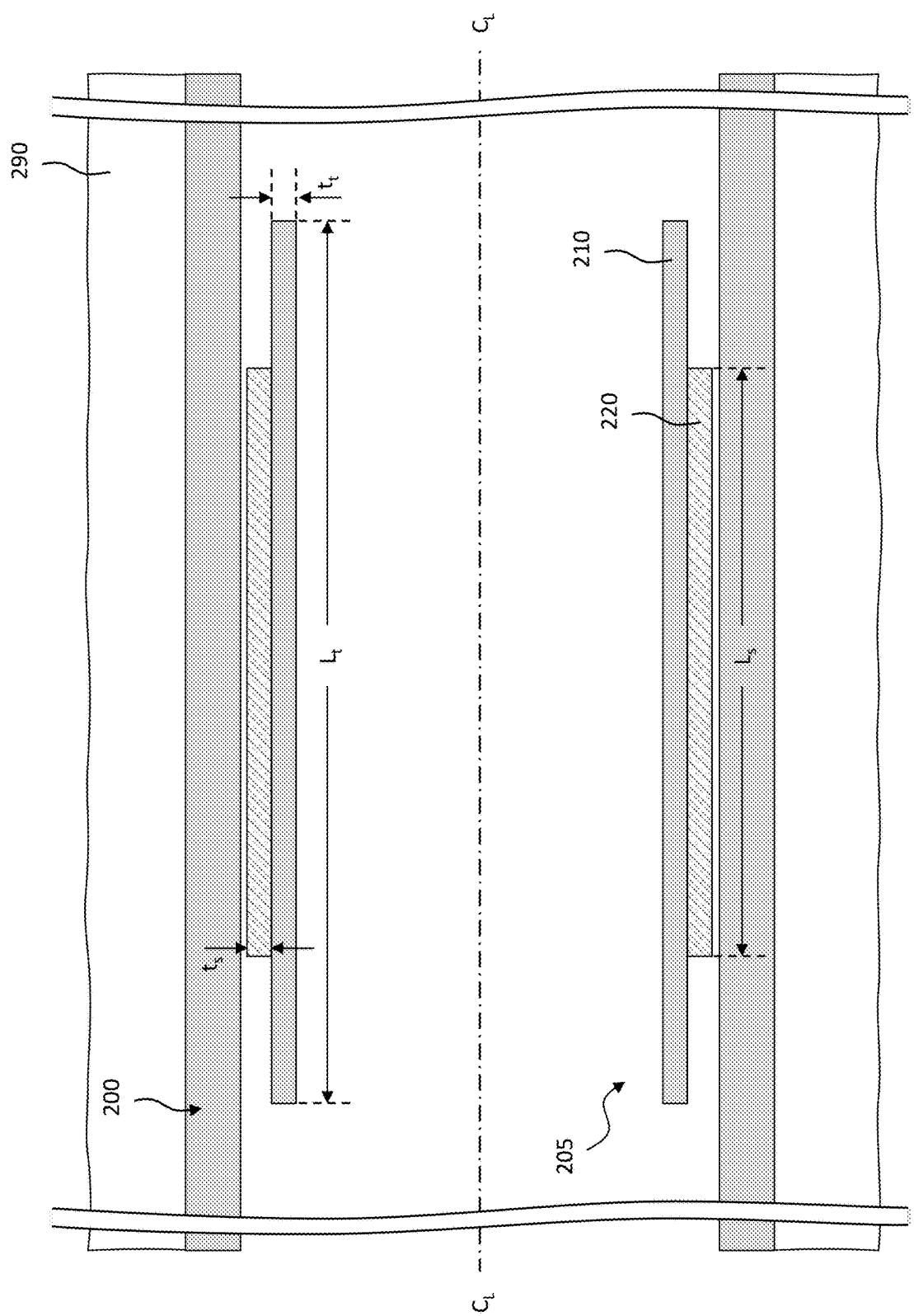
FIGS. 2A through 2C illustrate different deployment states for a fluid line including a patch designed, manufactured, and operated according to one aspect of the disclosure.
Figure 2B:
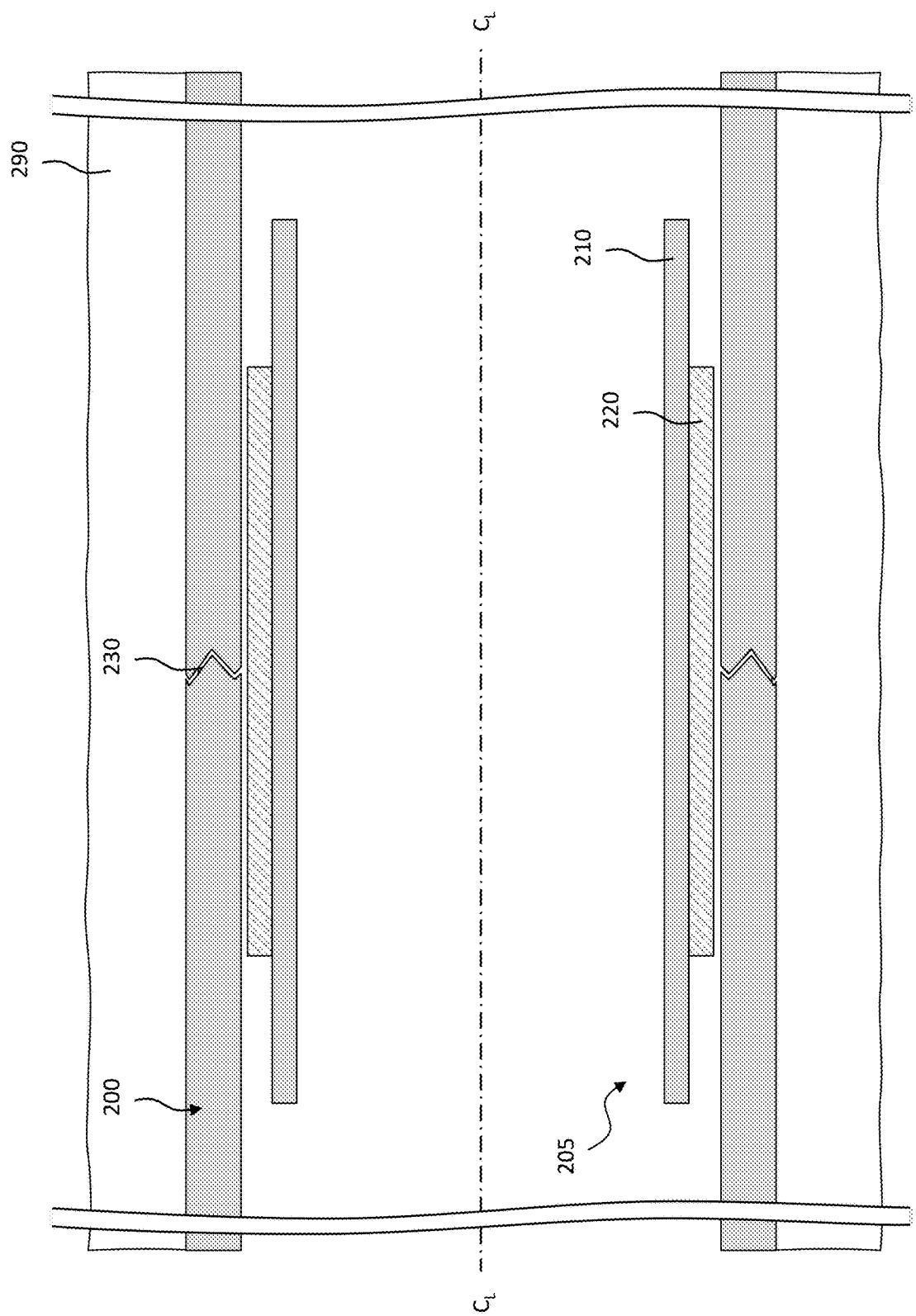
Figure 2C:
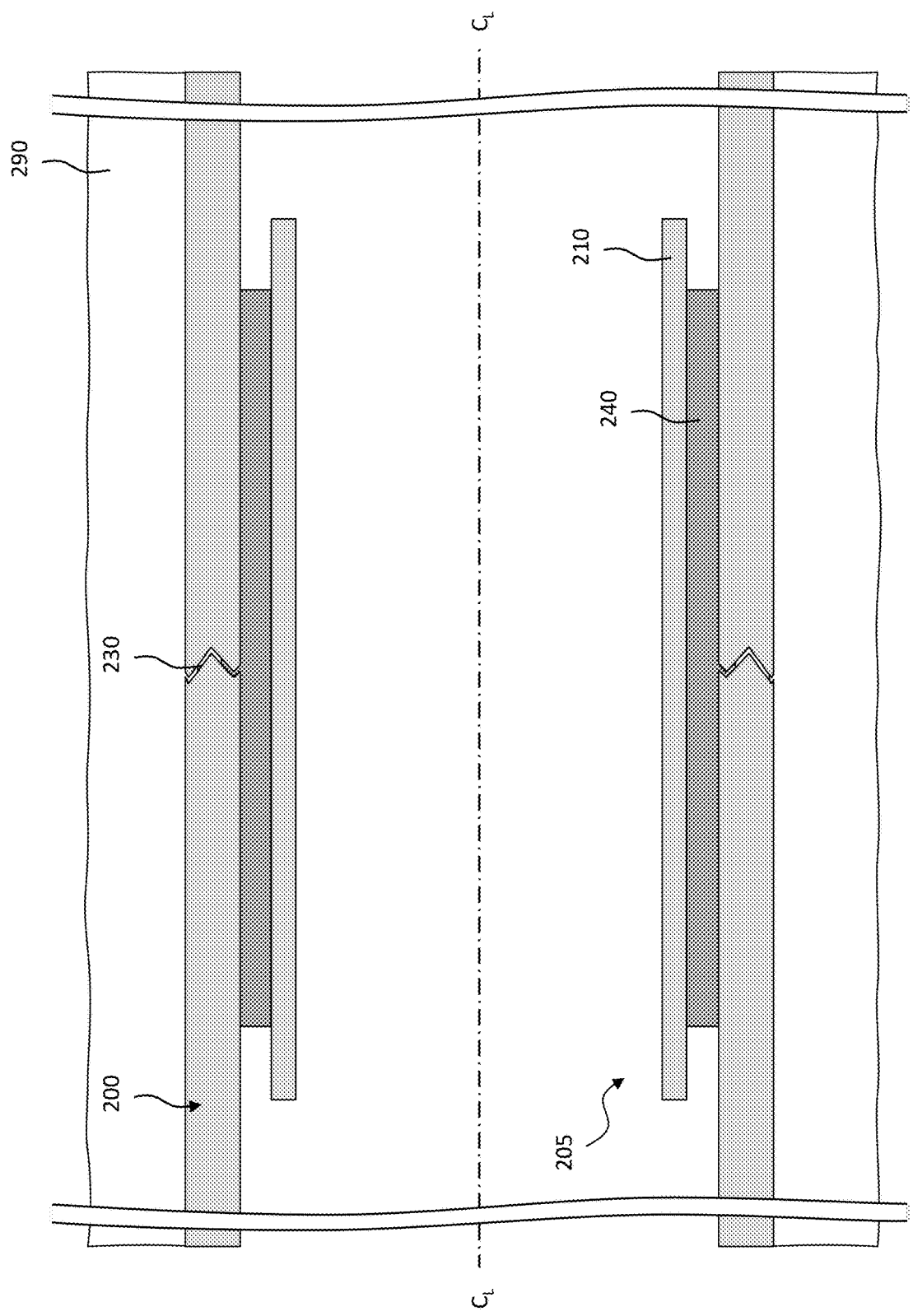

Turning now to FIGS. 2A through 2C, illustrated are different deployment states for a fluid line 200 having a patch 205 positioned therein, the patch 205 designed, manufactured, and operated according to one aspect of the disclosure. In the illustrated embodiment of FIGS. 2A through 2C, the fluid line 200 is positioned within a surrounding medium 290. In at least one embodiment, such as that shown, the surrounding medium 290 is a subterranean formation, and thus may comprise ground material. In another embodiment, the surrounding medium 290 is fluid, such as fresh or sea water, and in yet another embodiment, the surrounding medium 290 is the air. In yet another embodiment, the surrounding medium 290 is cement or another tubular. FIG. 2A illustrates the patch 205 pre-expansion, FIG. 2B illustrates the patch 205 after a leak has just occurred in the fluid line 200, but still pre-expansion, and FIG. 2C illustrates the patch 205 post-expansion, thereby sealing a leak in the fluid line 200. In certain embodiments, the patch 205 is positioned within the fluid line 200 and reacted prior to the leak in the fluid line 200 forming, whereas in other embodiments the patch 205 is positioned within the fluid line 200 after the leak has formed, and thus reacted after the leak has formed. Nevertheless, unless otherwise stated, the present disclosure is not limited to any specific order.

The fluid line 200 may comprise any type of fluid line, used for any purpose, and remain within the scope of the disclosure. In at least one embodiment, the fluid line 200 is a municipal fluid line, such as a municipal freshwater fluid line or a municipal wastewater fluid line. In yet another embodiment, the fluid line 200 is a power generation fluid line. The length of the fluid line 200, the outside and/or inside diameter of the fluid line 200, and the wall thickness of the fluid line 200 are not limited by the present disclosure.

As indicated above, a patch 205 is positioned within the fluid line 200. The patch 205, in the illustrated embodiment of FIGS. 2A through 2C, includes a tubular 210. The tubular 210, in the illustrated embodiment, is centered about a centerline ($C_L$). The tubular 210, in one or more embodiments, has a length ($L_t$) and a sidewall thickness ($t_t$). The length ($L_t$) may vary greatly and remain within the scope of the disclosure. For example, in at least one embodiment, the tubular 210 has a length ($L_t$) of at least 0.3 meters. In yet another embodiment, the tubular 210 has a length ($L_t$) of at least 1 meter. In yet another embodiment, the tubular 210 has a length ($L_t$) of at least 5 meters, and in at least one embodiment the tubular 210 has a length ($L_t$) of at least 10 meters. The tubular sidewall thickness ($t_t$) may also vary greatly and remain within the scope of the disclosure. For example, in at least one embodiment, the tubular sidewall thickness ($t_t$) ranges from 1 mm to 0.5 meters. In yet another embodiment, the tubular sidewall thickness ($t_t$) ranges from 0.2 cm to 10 cm, and in yet another embodiment ranges from 0.5 cm to 3 cm.

The tubular 210 may also comprise many different materials and remain within the scope of the disclosure. For example, in at least one embodiment the tubular 210 comprises cement. In at least one other embodiment, the tubular 210 comprises a metal, such as steel, copper, aluminum, etc. In yet another embodiment, the tubular 210 comprise a polymeric material. Nevertheless, the tubular 210 is not limited in material.

The patch 205, in at least one embodiment, additionally includes a sleeve of expandable metal 220 positioned about the tubular 210, for example between the tubular 210 and the fluid line 200. As discussed above, the sleeve of expandable metal 220 may comprise a metal configured to expand in response to hydrolysis, for example to seal a leaking section of the fluid line 200. The sleeve of expandable metal 220 may comprise any of the expandable metals discussed above. Moreover, there may be more than one, if not many, sleeves of expandable metal 220 for any given fluid line 200 and/or tubular 210.

In the illustrated embodiment, the sleeve of expandable metal 220 is positioned along only a portion of the length of the fluid line 200. The sleeve of expandable metal 220, in the illustrated embodiment, is placed within the fluid line 200 so that a leak in the fluid line 200 is covered. In another example, in at least one embodiment, the sleeve of expandable metal 220 is positioned proximate a zone of high erosion, such as at one or more junctions in the fluid line 200, arced and/or angled sections of the fluid line 200, sections of the fluid line 200 susceptible to high degrees of erosion, etc., for example prior to the leak forming.

The sleeve of expandable metal 220, in one or more embodiments, has a length ($L_s$) and a sidewall thickness ($t_s$). The length ($L_s$) may vary greatly and remain within the scope of the disclosure. For example, in at least one embodiment, the sleeve of expandable metal 220 has a length ($L_s$) of at least 0.2 meters. In yet another embodiment, the sleeve of expandable metal 220 has a length ($L_s$) of at least 0.9 meters. In yet another embodiment, the sleeve of expandable metal 220 has a length ($L_s$) of at least 4.5 meters, and in at least one embodiment the tubular 210 has a length ($L_s$) of at least 9 meters. In at least one other embodiment, the sidewall thickness ($t_s$) is at least 50% less than the sidewall thickness ($t_t$), and in yet another embodiment the sidewall thickness ($t_s$) is at least 200% less than the sidewall thickness ($t_t$), or even at least 2000% less.

With reference to FIG. 2B, illustrated is the patch 205 of FIG. 2A shortly after a leak 230 (e.g., crack in this instance) has formed in the sidewall of the fluid line 200. The leak 230 may form in many different situations. In at least one embodiment, the leak 230 forms as a result of expansion or compression of the fluid line 200, for example as a result of harsh weather conditions such as freezing temperatures and/or extreme heat. In yet another embodiment, the leak 230 forms as a result of the erosion or corrosion of the fluid line 200. In yet another embodiment, the leak 230 occurs as a result of natural disasters, such earthquakes, hurricanes, etc., among other reasons With reference to FIG. 2C, illustrated is the patch 205 of FIG. 2B after the sleeve of expandable metal 220 has been exposed to reactive fluid from the interior of the fluid line 200, thereby sealing the leak 230. What results is expanded metal 240 sealing the leak 230. In the illustrated embodiment of FIG. 2C, all of the sleeve of expandable metal 220 has been subjected to hydrolysis to form the fully expanded metal 240. Accordingly, in at least the embodiment of FIG. 2C, the expanded metal 240 does not include any residual unreacted metal. In one or more embodiments, the expanded metal 240 extends at least partially within the leak 230, such as shown in FIG. 2C. In other embodiments, the expanded metal 240 does not extend within the leak 230, but still seals the leak 230 from the inside of the fluid line 200.

Figure 3A:
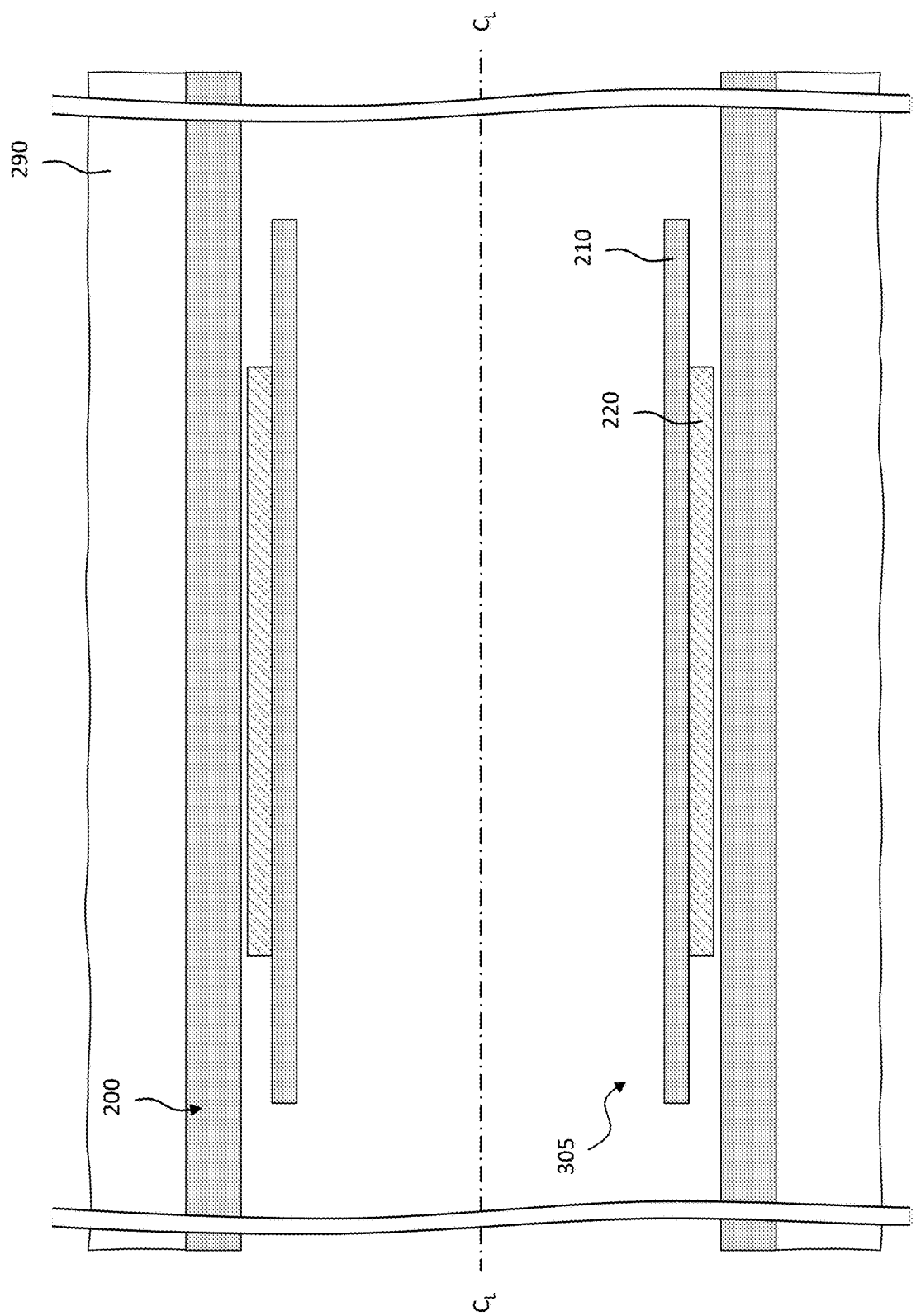
Figure 3B:
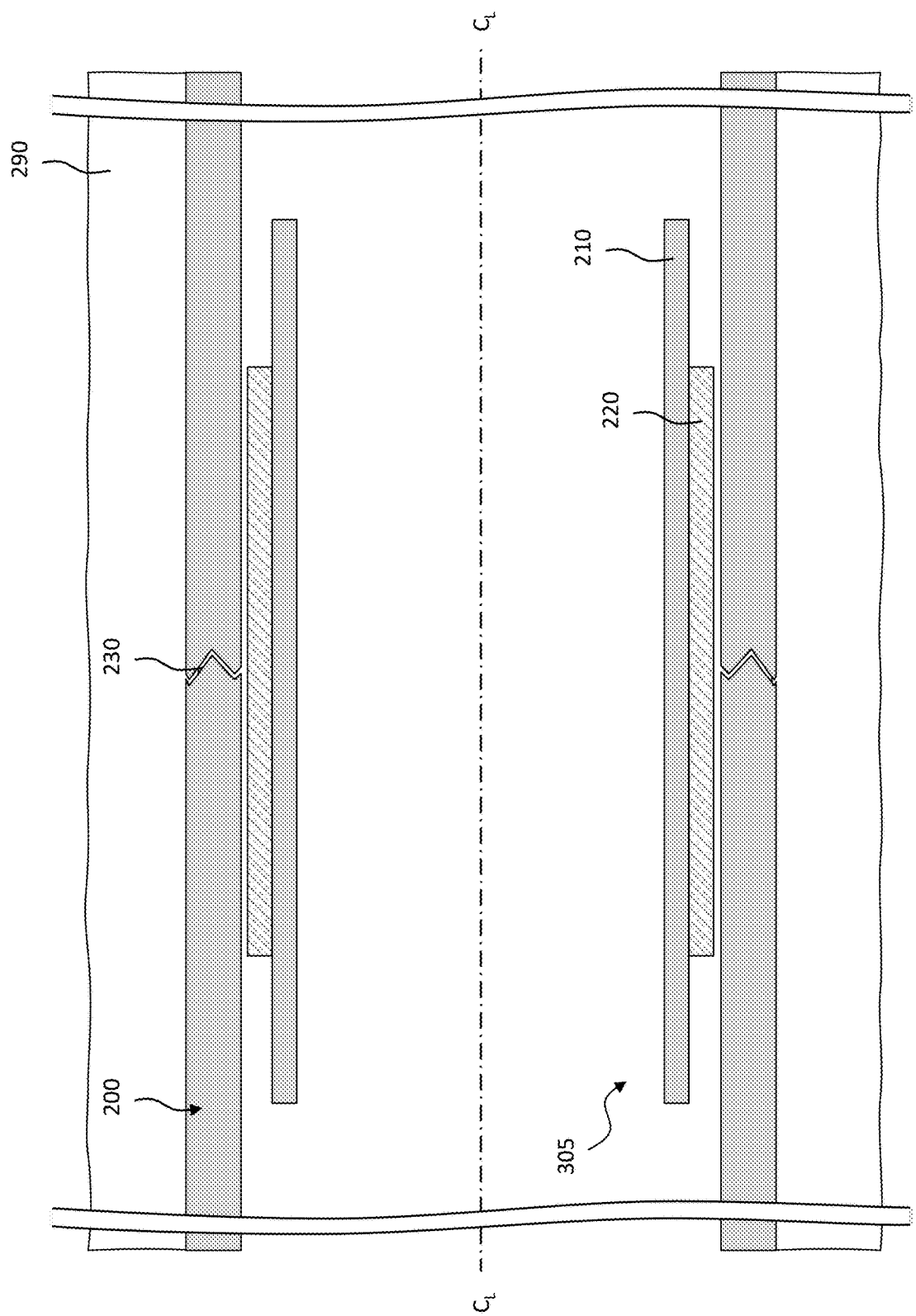

Turning now to FIGS. 3A through 3C, depicted are various different manufacturing states for a fluid line 200 having a patch 305 designed, manufactured, and operated according to an alternative embodiment of the disclosure. FIG. 3A illustrates the patch 305 pre-expansion, FIG. 3B illustrates the patch 305 after a leak has just occurred, but still pre-expansion, and FIG. 3C illustrates the patch 305 post-expansion, thereby sealing the leak. As disclosed above, the expandable metal of FIGS. 3A and 3B may be subjected to a suitable reactive fluid from within the fluid line 200, thereby forming the expanded metal shown in FIG. 3C.

The patch 305 of FIGS. 3A through 3C is similar in many respects to the patch 205 of FIGS. 2A through 2C. Accordingly, like reference numbers have been used to illustrate similar, if not identical, features. The patch 305 differs, for the most part, from the patch 205, in that the patch 305 includes a first portion of expanded metal 340 surrounding the leak 230, and a second portion of non-expanded metal 350 surrounded by the first portion of expanded metal 340. For example, in one embodiment a first volume of the first portion of expanded metal 340 is less than a second volume of the second portion of non-expanded metal 350. In another embodiment, the first volume of the first portion of expanded metal 340 is no more than 50% of the second volume of the second portion of non-expanded metal 350, or in certain other embodiments no more than 10% of the second volume of the second portion of non-expanded metal 350. The second portion of non-expanded metal 350, in at least one embodiment, allows the patch 305 to self-heal if further leaks occur.

Figure 4A:
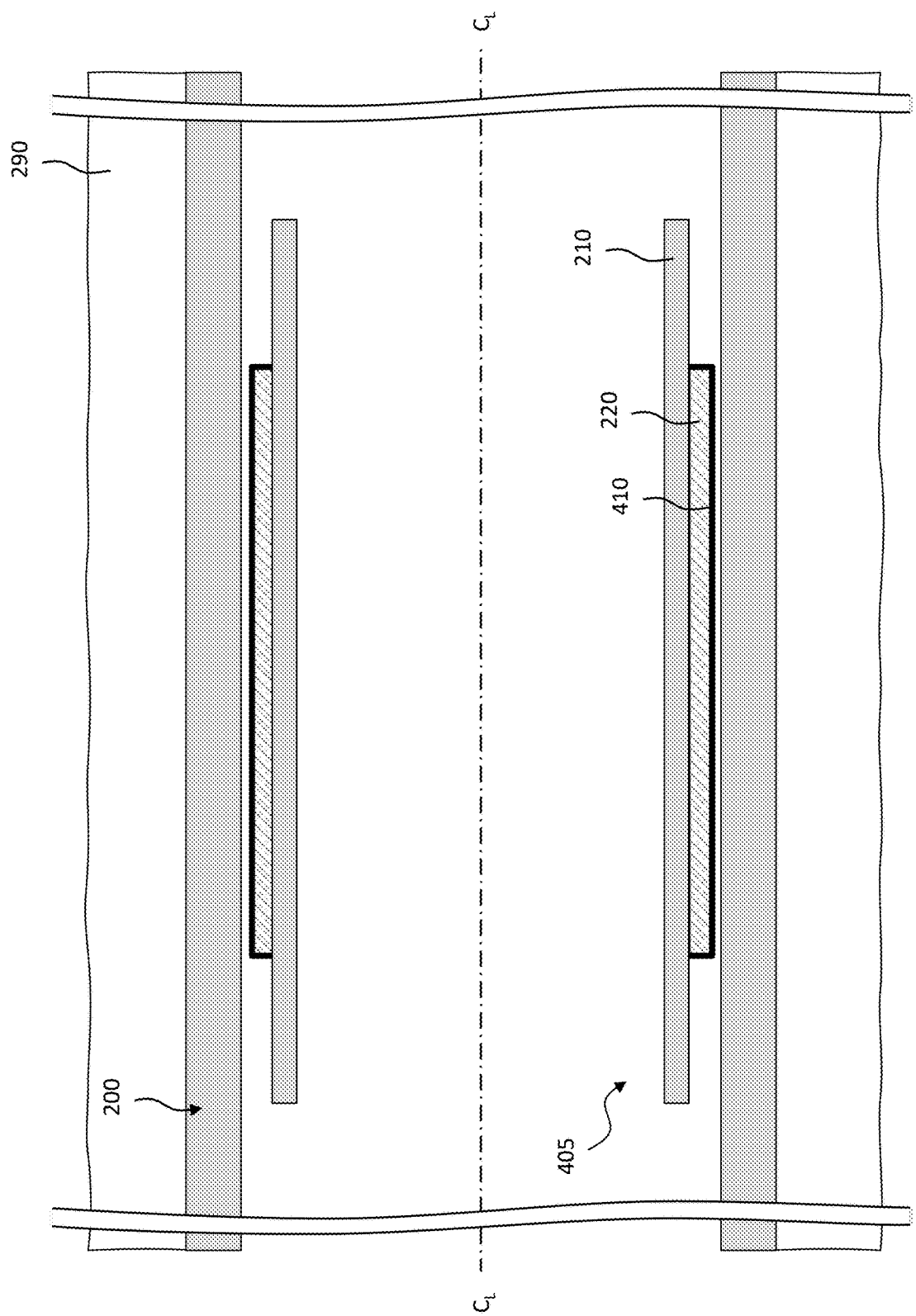

Turning now to FIGS. 4A through 4C, depicted are various different manufacturing states for a fluid line 200 having a patch 405 designed, manufactured, and operated according to an alternative embodiment of the disclosure. FIG. 4A illustrates the patch 405 pre-expansion, FIG. 4B illustrates the patch 405 after a leak has just occurred, but still pre-expansion, and FIG. 4C illustrates the patch 405 post-expansion, thereby sealing the leak. As disclosed above, the expandable metal of FIGS. 4A and 4B may be subjected to a suitable reactive fluid from within the fluid line 200, thereby forming the expanded metal shown in FIG. 4C.

The patch 405 of FIGS. 4A through 4C is similar in many respects to the patch 205 of FIGS. 2A through 2C. Accordingly, like reference numbers have been used to illustrate similar, if not identical, features. The patch 405 differs, for the most part, from the patch 205, in that the patch 405 includes a delay coating 410 surrounding the sleeve of expandable metal 220. In at least one embodiment, the delay coating 410 is configured to protect those surfaces of the sleeve of expandable metal 220 not in contact with the tubular 210 from encountering a reactive fluid. The delay coating 410, may comprise any of the delay coatings discussed above, among others. The delay coating 410 in at least one embodiment, is a non-permanent delay.

Figure 5A:
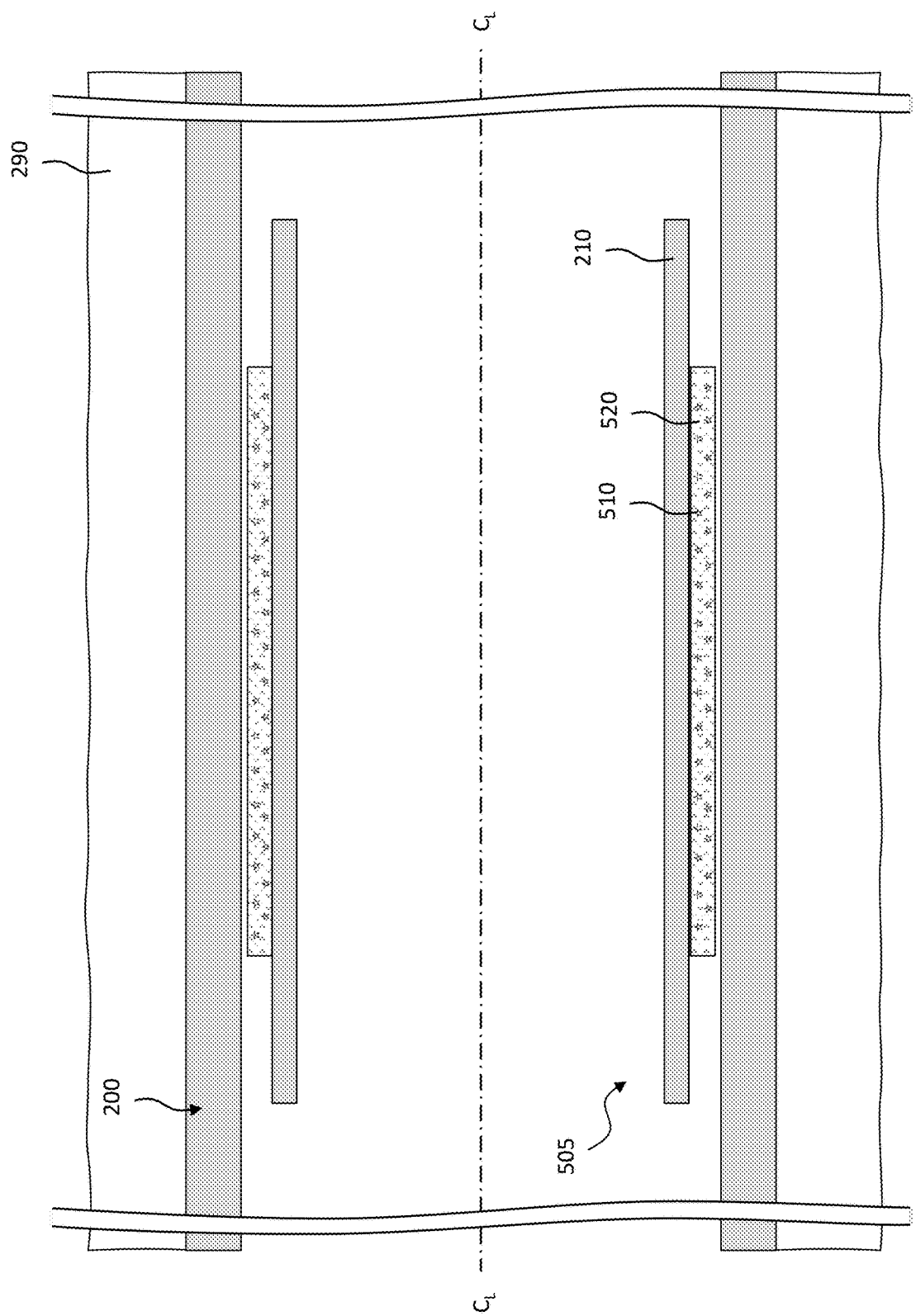
Figure 5C:
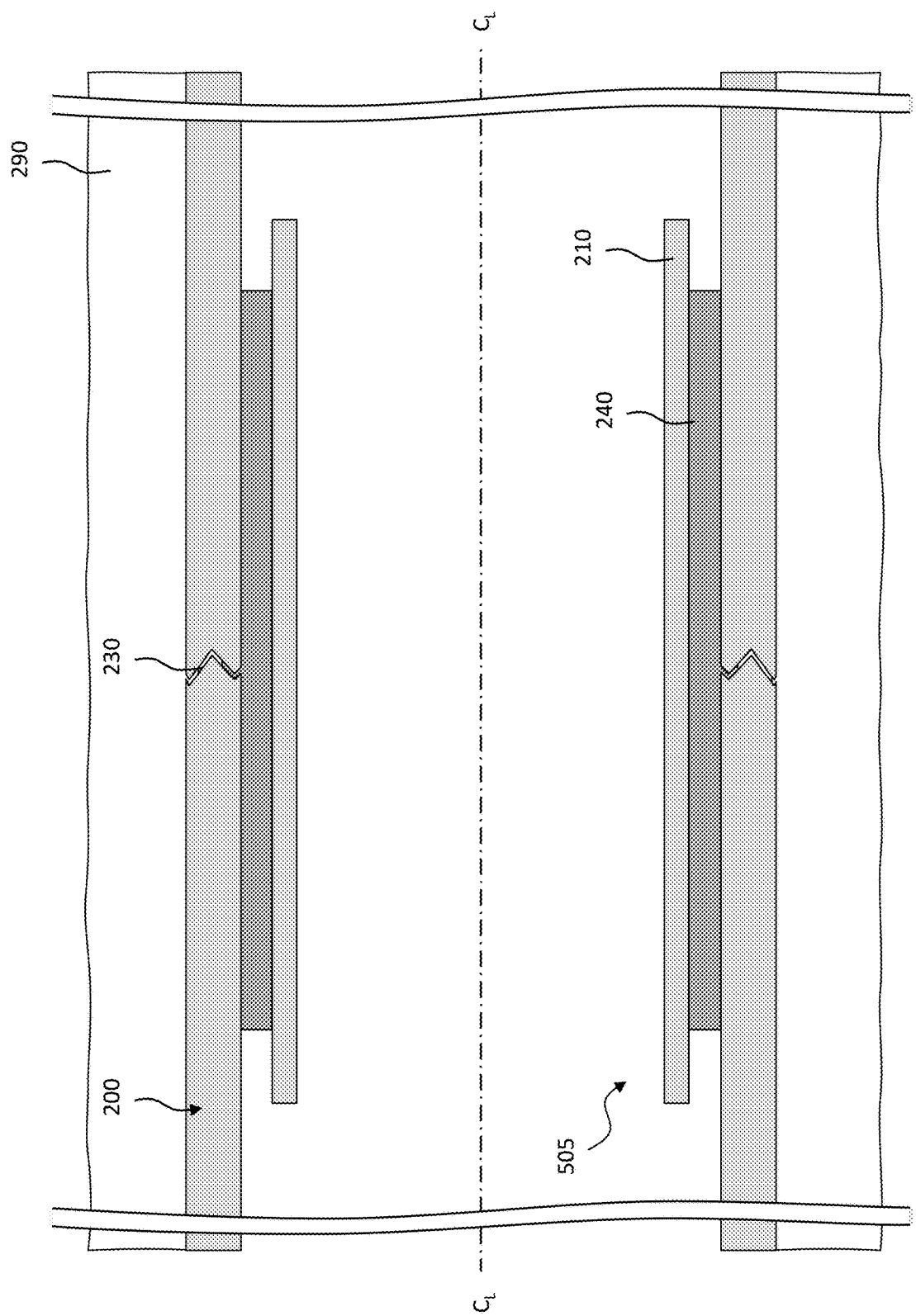

Turning now to FIGS. 5A through 5C, depicted are various different manufacturing states for a fluid line 200 having a patch 505 designed, manufactured, and operated according to an alternative embodiment of the disclosure. FIG. 5A illustrates the patch 505 pre-expansion, FIG. 5B illustrates the patch 505 after a leak has just occurred, but still pre-expansion, and FIG. 5C illustrates the patch 505 post-expansion, thereby sealing the leak. As disclosed above, the expandable metal of FIGS. 5A and 5B may be subjected to a suitable reactive fluid from within the fluid line 200, thereby forming the expanded metal shown in FIG. 5C.

The patch 505 of FIGS. 5A through 5C is similar in many respects to the patch 205 of FIGS. 2A through 2C. Accordingly, like reference numbers have been used to illustrate similar, if not identical, features. The patch 505 differs, for the most part, from the patch 205, in that the patch 505 is a collection of individual separate chunks of expandable metal 510 held together with a binding agent 520. The individual separate chunks of expandable metal 510 and the binding agent 520 may be similar to that discussed above.

Figure 6A:
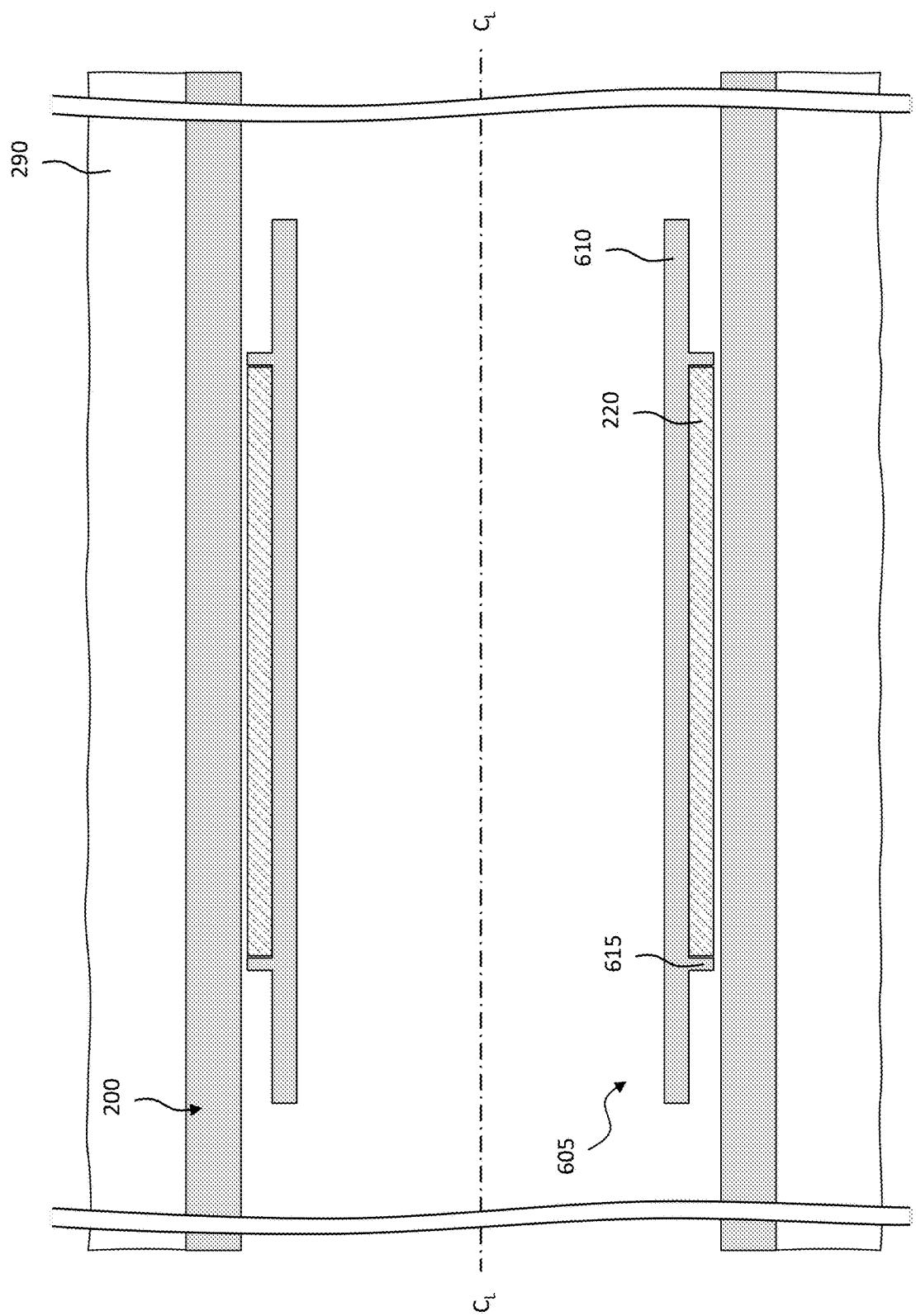
FIGS. 6A through 6C illustrate different deployment states for a fluid line and patch designed, manufactured, and operated according to an alternative aspect of the disclosure.
Figure 6B:
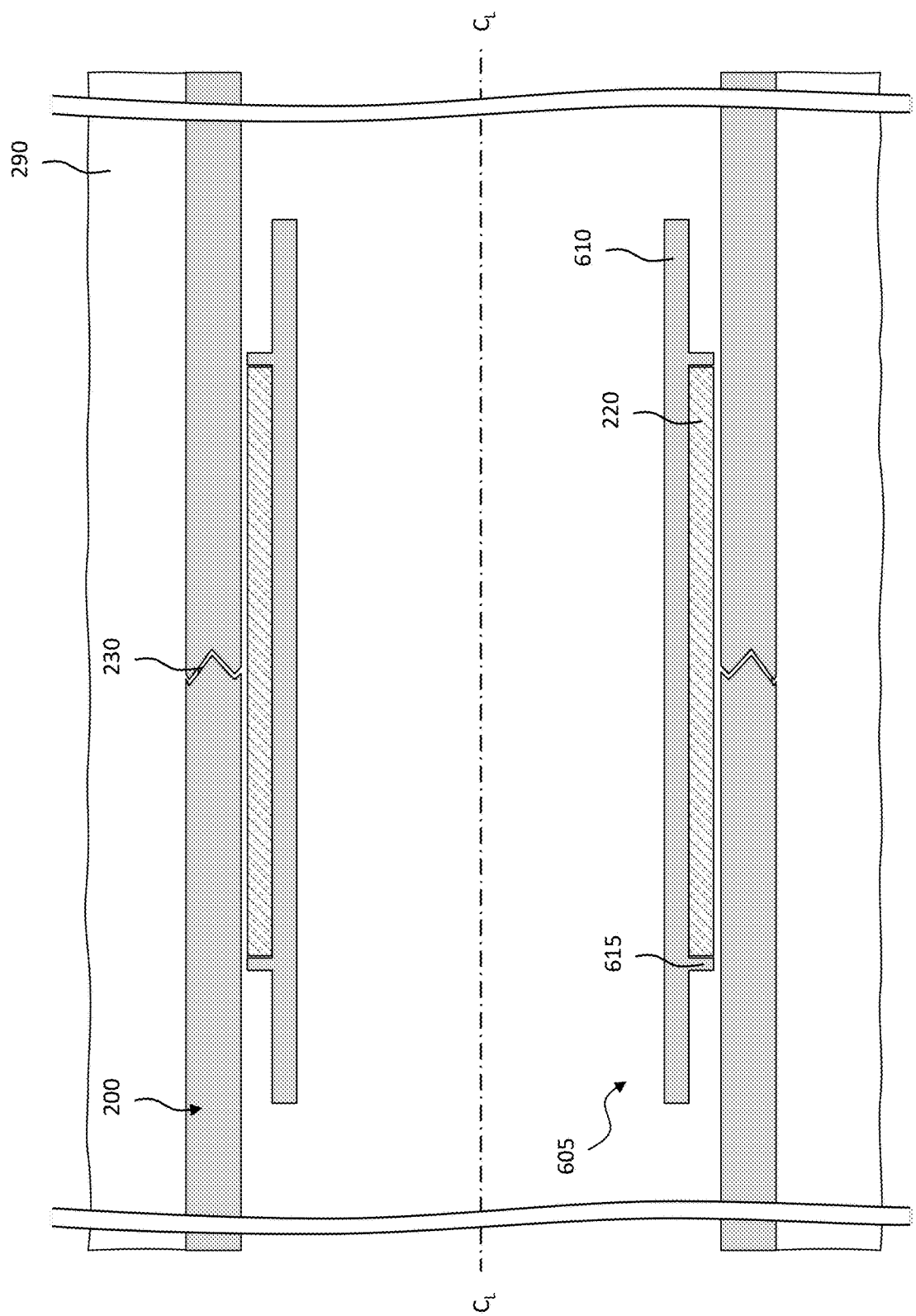
Figure 6C:
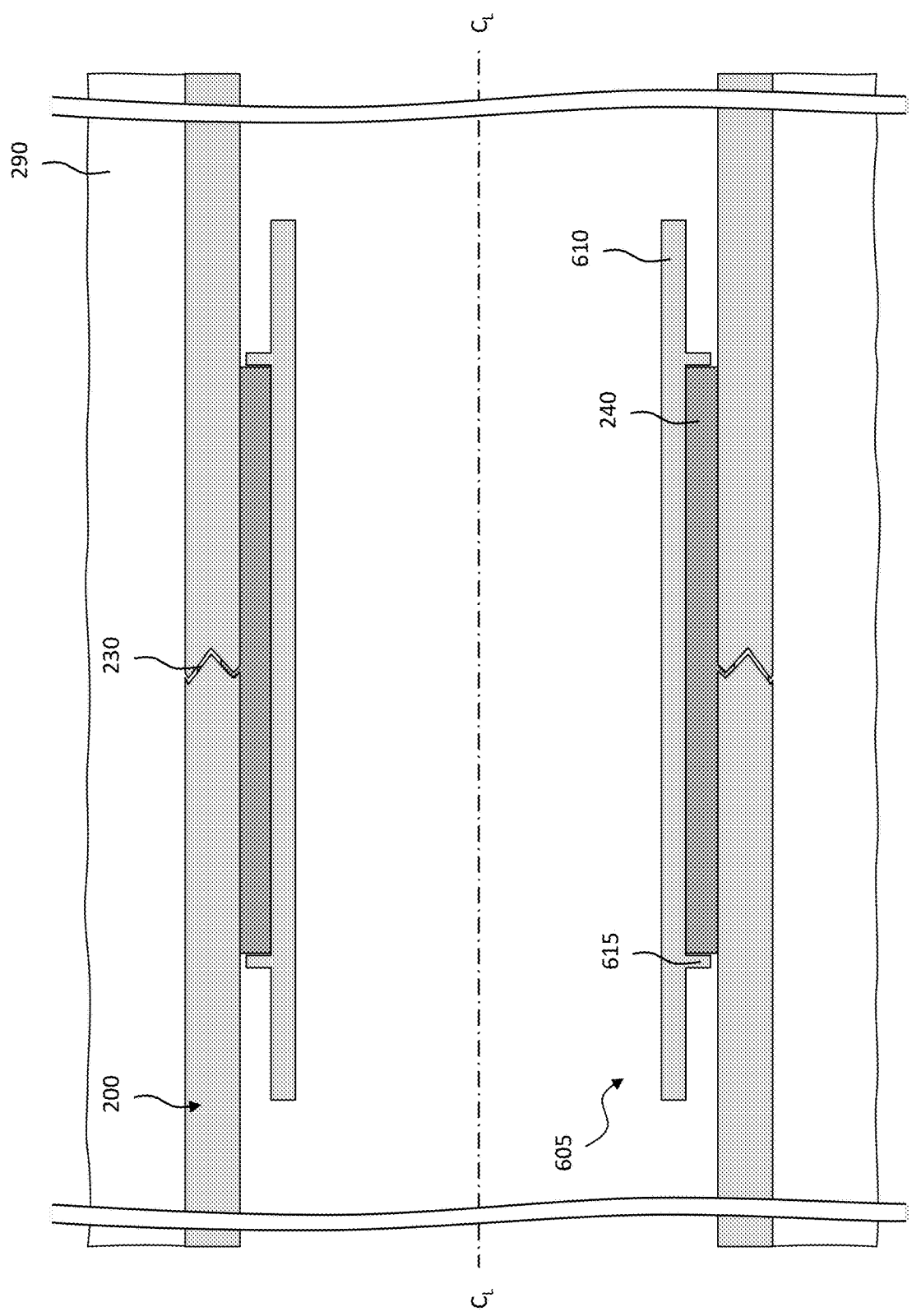

Turning now to FIGS. 6A through 6C, depicted are various different manufacturing states for a fluid line 200 having a patch 605 designed, manufactured, and operated according to an alternative embodiment of the disclosure. FIG. 6A illustrates the patch 605 pre-expansion, FIG. 6B illustrates the patch 605 after a leak has just occurred, but still pre-expansion, and FIG. 6C illustrates the patch 605 post-expansion, thereby sealing the leak. As disclosed above, the expandable metal of FIGS. 6A and 6B may be subjected to a suitable reactive fluid from within the fluid line 200, thereby forming the expanded metal shown in FIG. 6C.

The patch 605 of FIGS. 6A through 6C is similar in many respects to the patch 205 of FIGS. 2A through 2C. Accordingly, like reference numbers have been used to illustrate similar, if not identical, features. The patch 605 differs, for the most part, from the patch 205, in that the patch 605 employs a tubular 610 with end caps 615. The end caps 615, in at least one embodiment, surround the sleeve of expandable metal 220 and thereby cause the sleeve of expandable metal 220 to expand primarily radially, as opposed to radially expand and linearly expand.

Figure 7A:
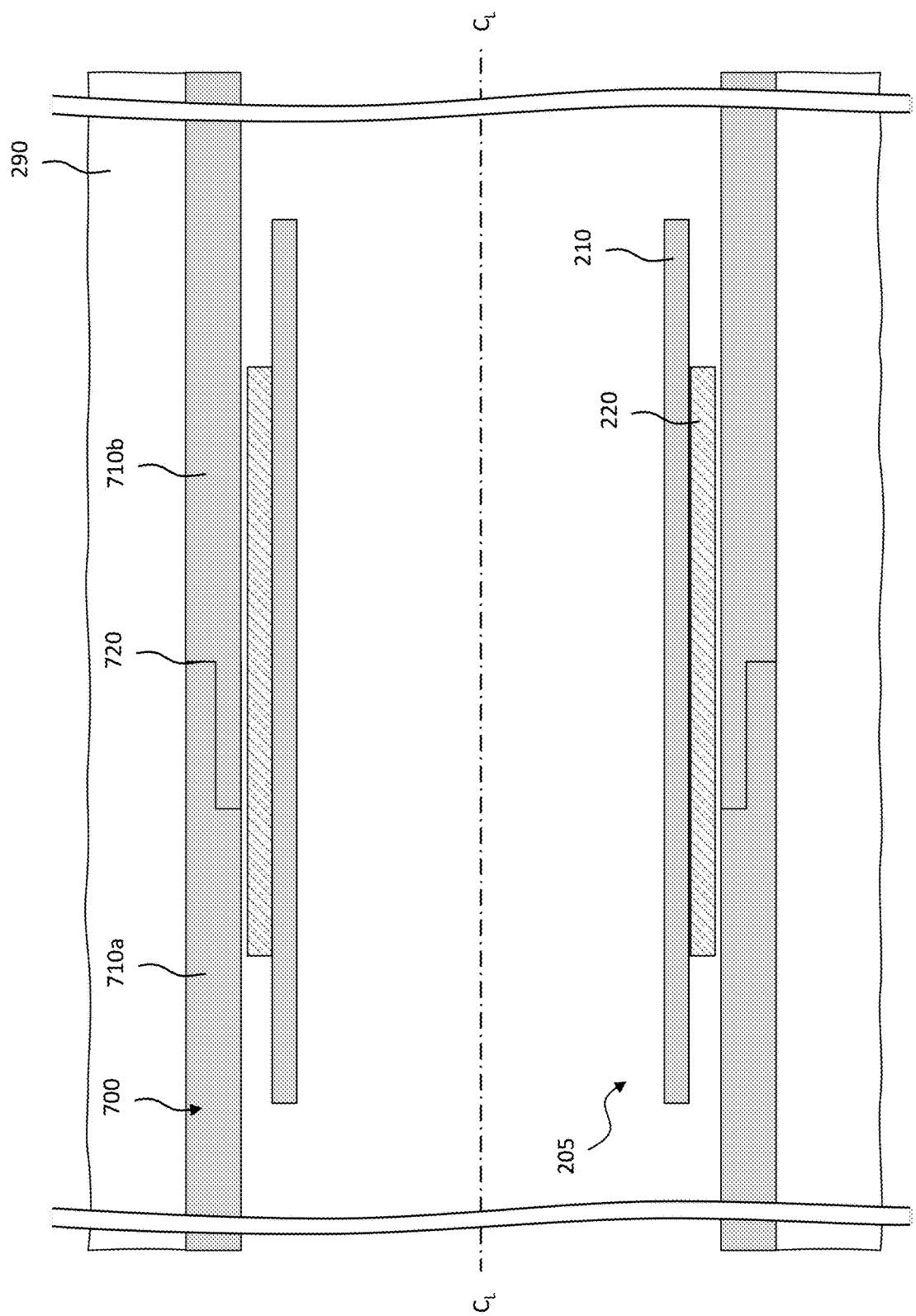
FIGS. 7A through 7C illustrate different deployment states for a fluid line and designed, manufactured, and operated according to an alternative aspect of the disclosure.
Figure 7B:
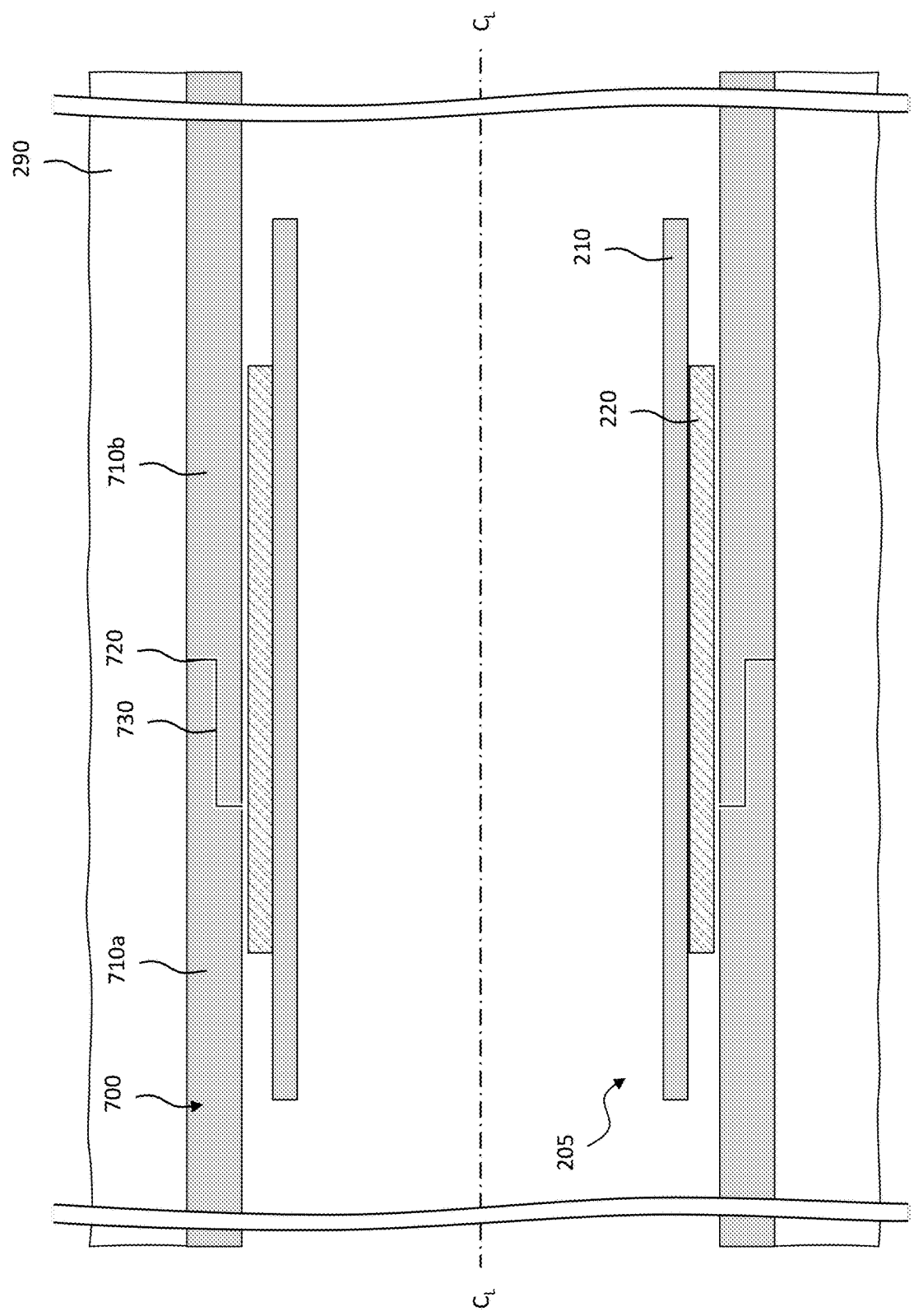
Figure 7C:
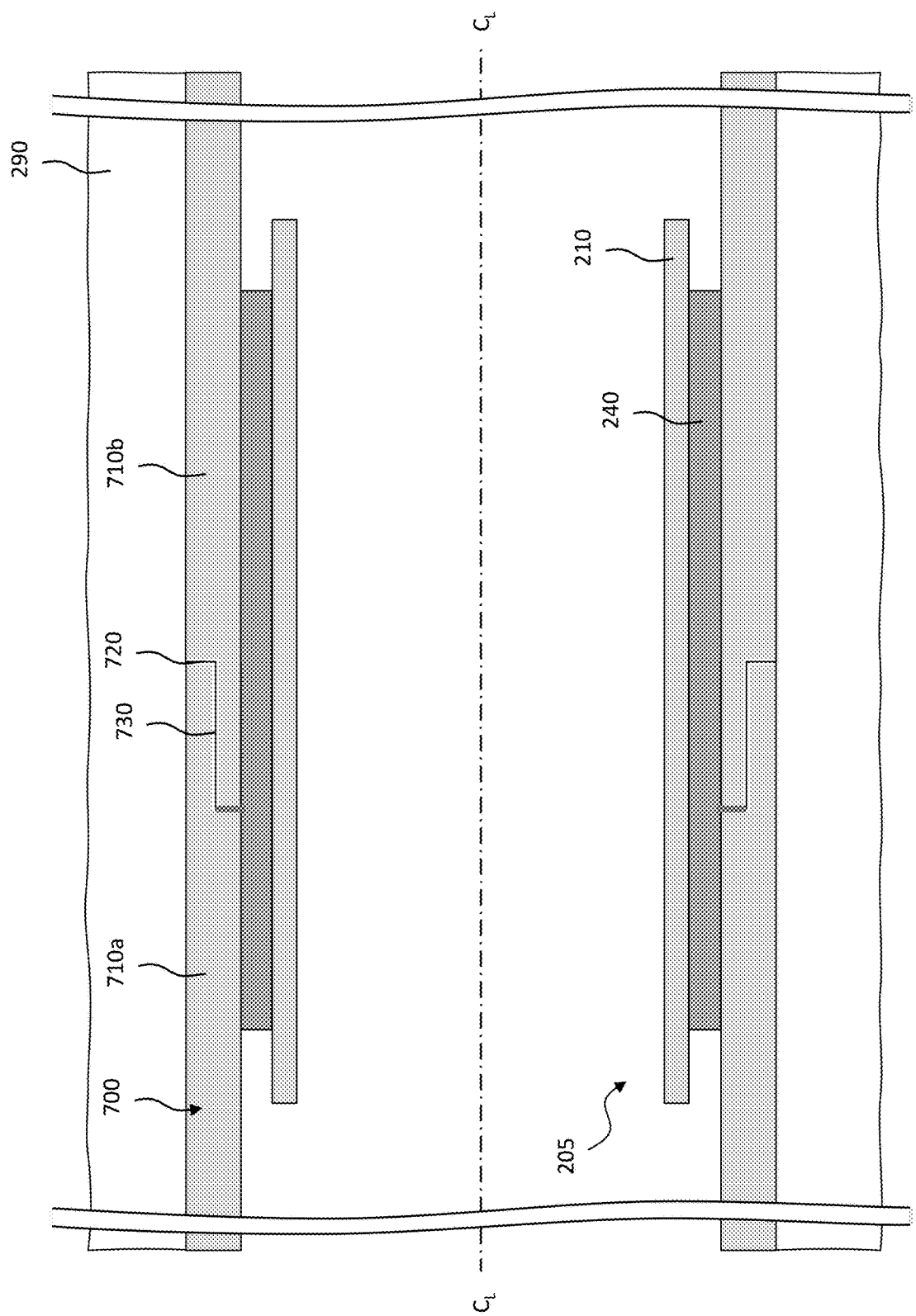

Turning now to FIGS. 7A through 7C, depicted are various different manufacturing states for a fluid line 700 having a patch 205 designed, manufactured, and operated according to an alternative embodiment of the disclosure. FIG. 7A illustrates the patch 205 pre-expansion, FIG. 7B illustrates the patch 205 after a leak has just occurred, but still pre-expansion, and FIG. 7C illustrates the patch 205 post-expansion, thereby sealing the leak. As disclosed above, the expandable metal of FIGS. 7A and 7B may be subjected to a suitable reactive fluid from within the fluid line 700, thereby forming the expanded metal shown in FIG. 7C.

The fluid line 700 of FIGS. 7A through 7C is similar in many respects to the fluid line 200 of FIGS. 2A through 2C. Accordingly, like reference numbers have been used to illustrate similar, if not identical, features. The fluid line 700 differs, for the most part, from the fluid line 200, in that it includes a first tubular section 710a and a second tubular section 710b forming a junction 720 therebetween, and further wherein the sleeve of expandable metal 220 surrounds the junction 720. In at least one embodiment, the junction 720 is an end-to-end junction. For example, in at least one embodiment, the first tubular section 710a and the second tubular section 710b are within 10 degrees of parallel with one another, thereby forming a linear junction. In at least one embodiment, the junction 720, for one or more reasons, forms a leak 730.

While a linear junction has been illustrated in FIGS. 7A through 7C, other embodiments exist wherein the junction is a non-linear junction. For example, in one embodiment, the first tubular section 710a and the second tubular section 710b are greater than 20 degrees of parallel with one another. For example, in such an embodiment, the first tubular section 710a and the second tubular section 710b form a T-shaped junction or a Y-shaped junction.

Figure 8A:
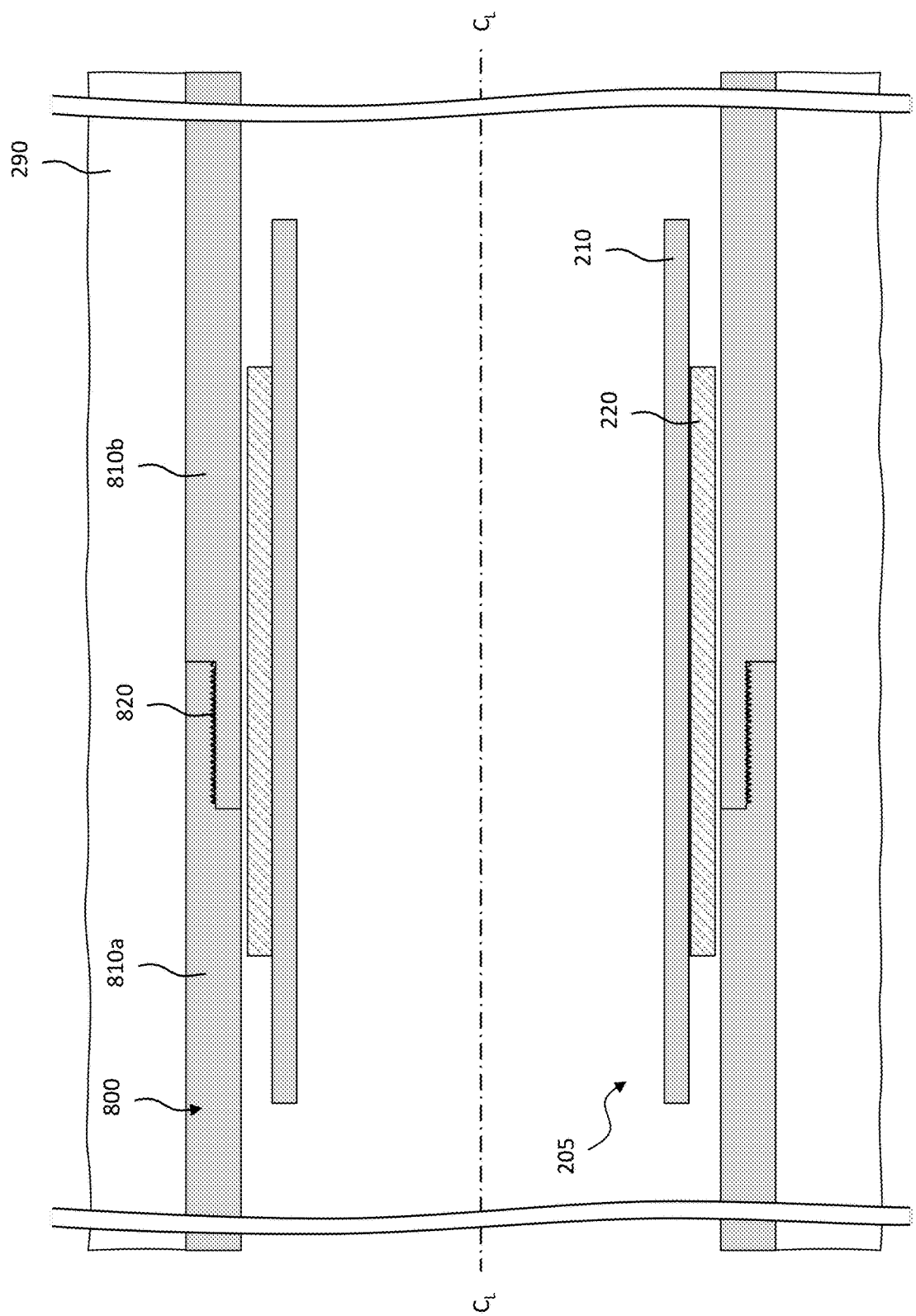
FIGS. 8A through 9C illustrate different deployment states for a fluid line and designed, manufactured, and operated according to an alternative aspect of the disclosure.
Figure 8C:
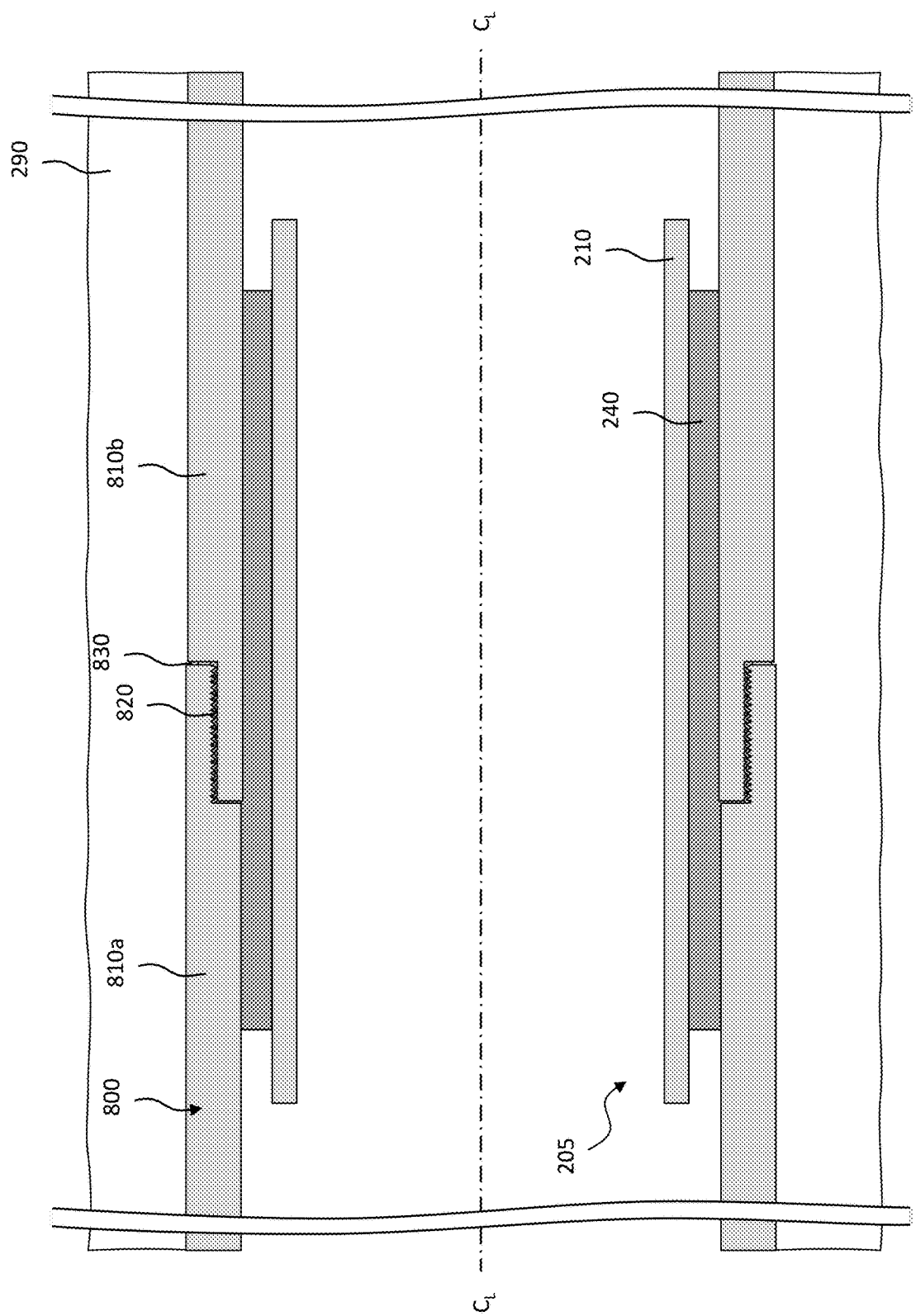

Turning now to FIGS. 8A through 8C, depicted are various different manufacturing states for a fluid line 800 having a patch 205 designed, manufactured, and operated according to an alternative embodiment of the disclosure. FIG. 8A illustrates the patch 205 pre-expansion, FIG. 8B illustrates the patch 205 after a leak has just occurred, but still pre-expansion, and FIG. 8C illustrates the patch 205 post-expansion, thereby sealing the leak. As disclosed above, the expandable metal of FIGS. 8A and 8B may be subjected to a suitable reactive fluid from within the fluid line 800, thereby forming the expanded metal shown in FIG. 8C.

The fluid line 800 of FIGS. 8A through 8C is similar in many respects to the fluid line 700 of FIGS. 7A through 7C. Accordingly, like reference numbers have been used to illustrate similar, if not identical, features. The fluid line 800 differs, for the most part, from the fluid line 700, in that the first tubular section 810a and the second tubular section 810b have a threaded junction 820 therebetween. In at least one embodiment, the threaded junction 820, for one or more reasons, forms a leak 830.

Figure 9A:
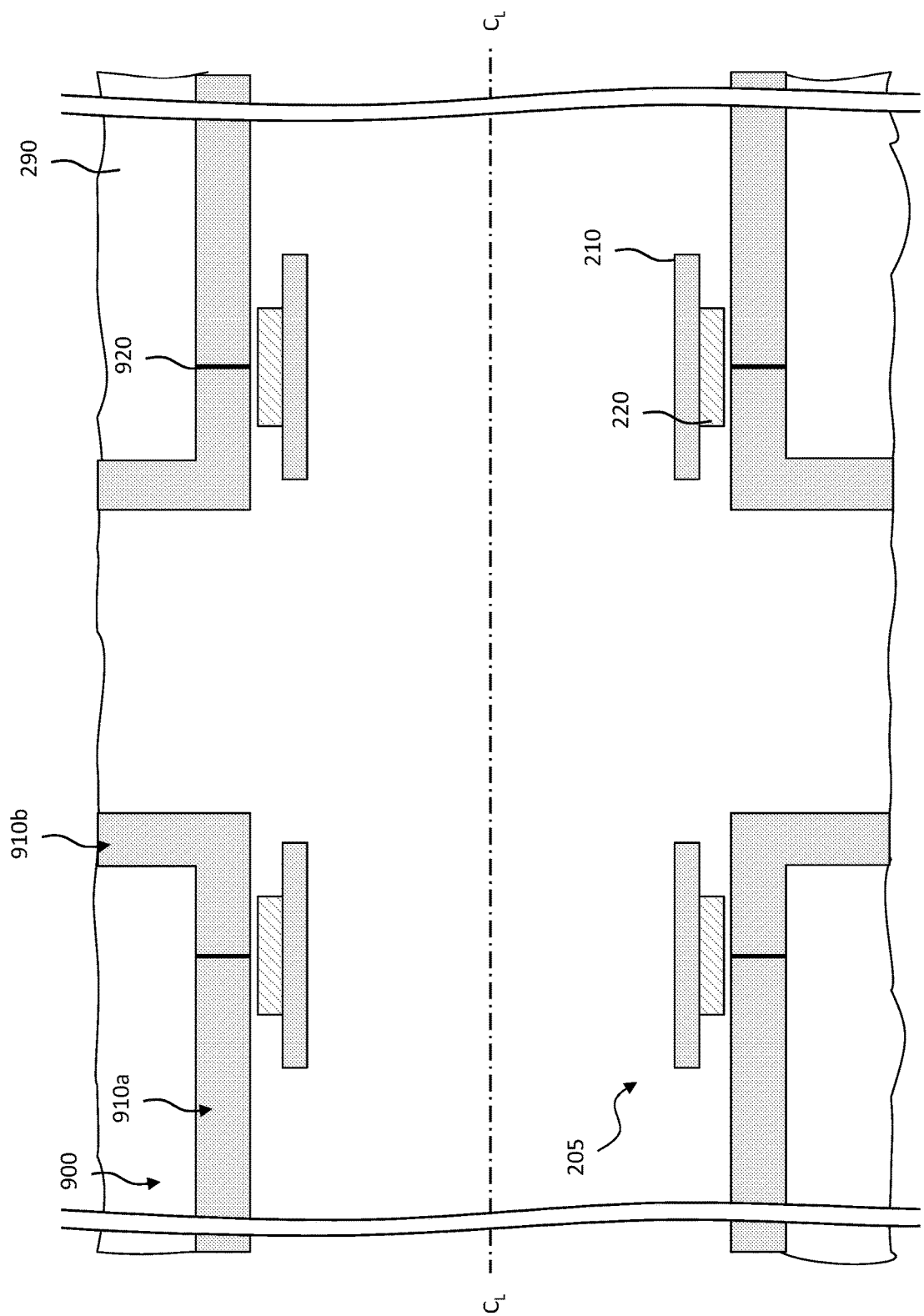
Figure 9B:
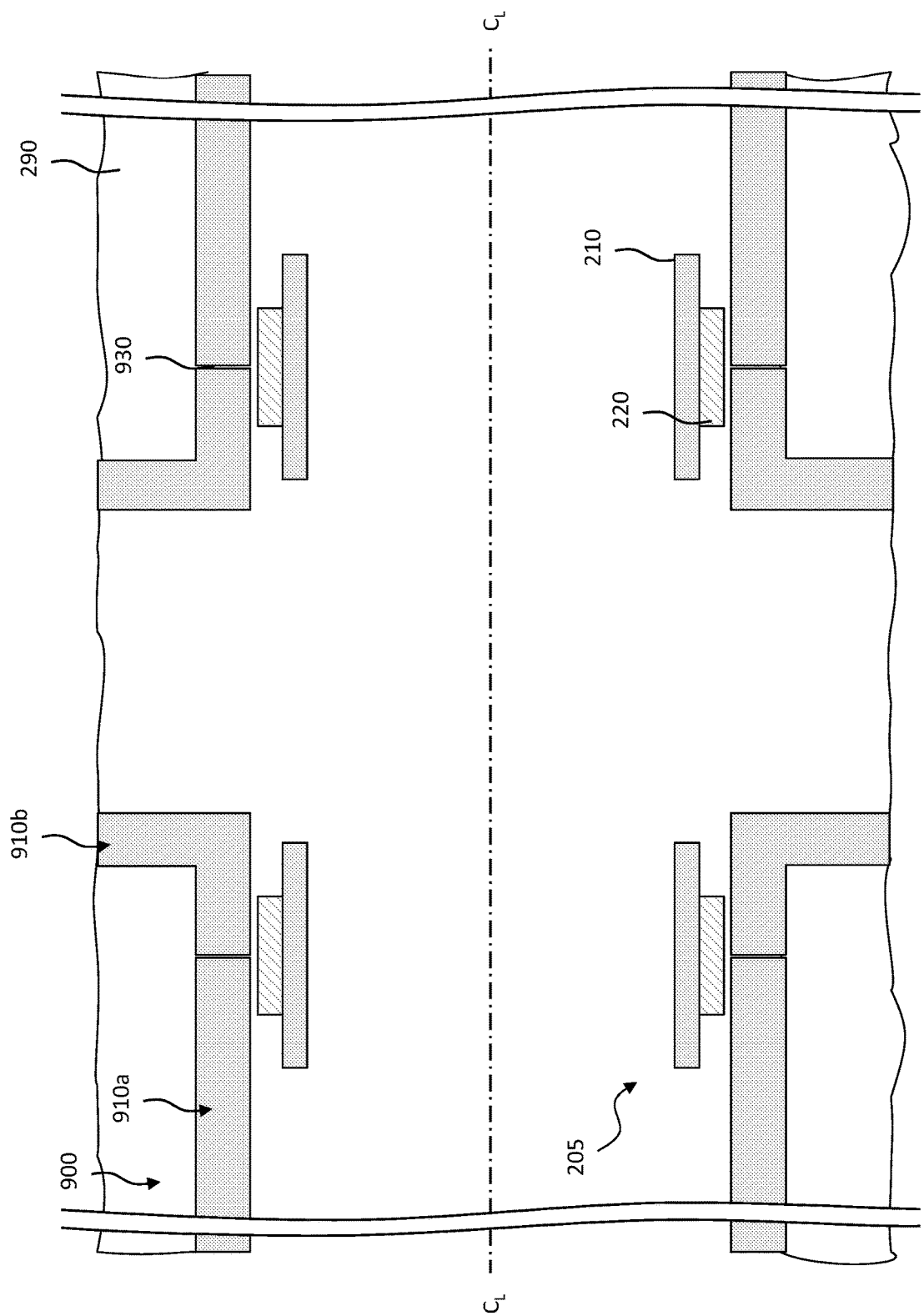
Figure 9C:
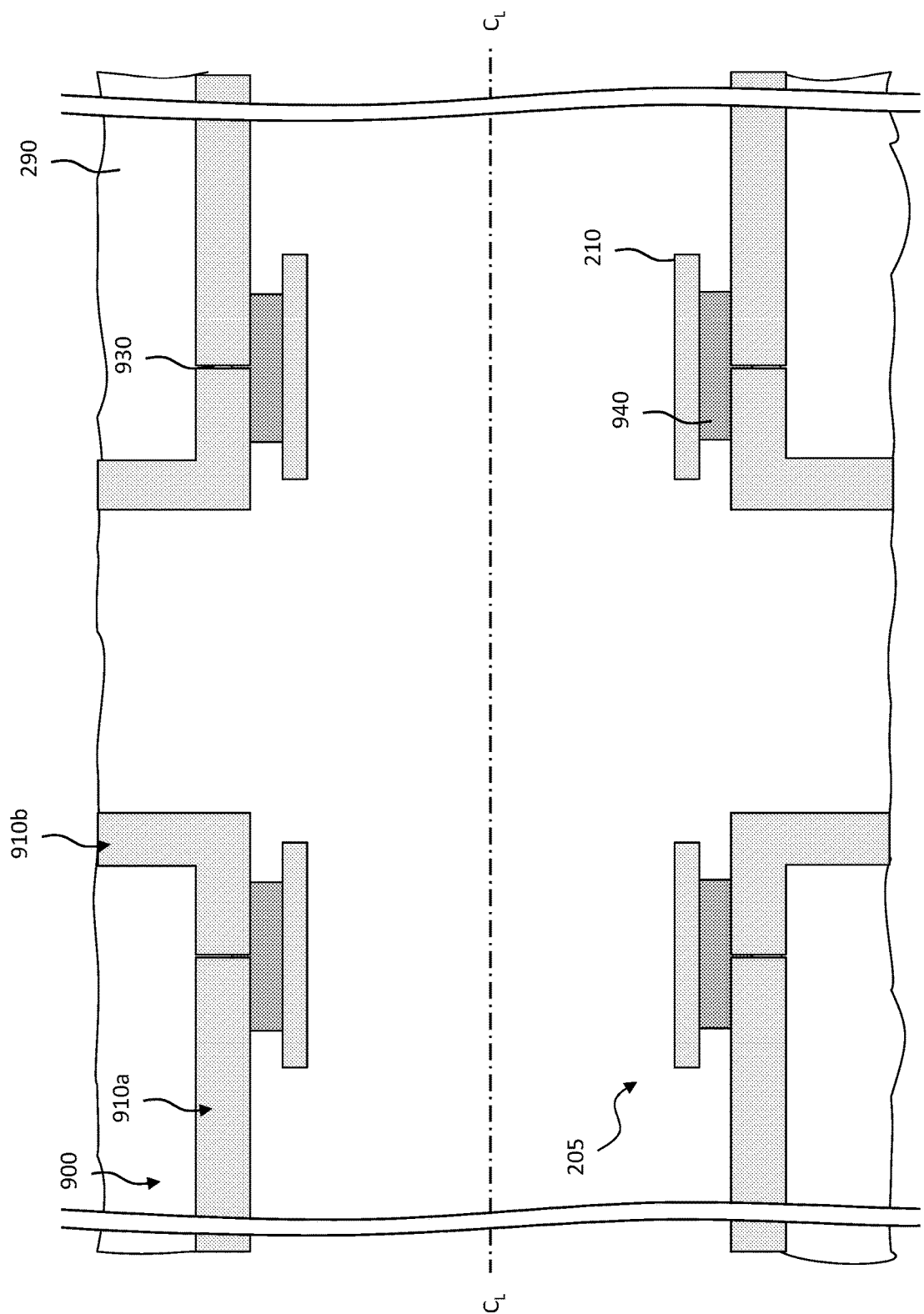

Turning now to FIGS. 9A through 9C, depicted are various different manufacturing states for a fluid line 900 having a patch 205 designed, manufactured, and operated according to an alternative embodiment of the disclosure. FIG. 9A illustrates the patch 205 pre-expansion, FIG. 9B illustrates the patch 205 after a leak has just occurred, but still pre-expansion, and FIG. 9C illustrates the patch 205 post-expansion, thereby sealing the leak. As disclosed above, the expandable metal of FIGS. 9A and 9B may be subjected to a suitable reactive fluid from within the fluid line 900, thereby forming the expanded metal shown in FIG. 9C.

The fluid line 900 of FIGS. 9A through 9C is similar in many respects to the fluid line 700 of FIGS. 7A through 7C. Accordingly, like reference numbers have been used to illustrate similar, if not identical, features. The fluid line 900 differs, for the most part, from the fluid line 700, in that the first tubular section 910*a* and the second tubular section 910*b* form a T-shaped junction. In at least one embodiment, the T-shaped junction, for one or more reasons, forms a leak 930.

Aspects disclosed herein include:

A. A patch for a fluid line, the patch including: 1) a tubular; and 2) a sleeve of expandable metal positioned about the tubular, the sleeve of expandable metal comprising a metal configured to expand in response to hydrolysis and thereby seal a leaking section of a fluid line.

B. A system, the system including: 1) a fluid line positioned within a surrounding medium; and 2) a patch positioned within the fluid line, the patch including; a) a tubular; and b) a sleeve of expanded metal positioned about the tubular, the sleeve of expanded metal comprising a metal that has expanded in response to hydrolysis to thereby seal a leaking section of the fluid line.

C. A method for sealing a fluid line, the method including: 1) providing a fluid line within a surrounding medium; and 2) positioning a patch within the fluid line, the patch including; a) a tubular; and b) a sleeve of expandable metal positioned about the tubular, the sleeve of expandable metal comprising a metal configured to expand in response to hydrolysis; and 3) allowing reactive fluid passing through the fluid line to react with the sleeve of expandable metal and expand to form an expanded metal portion that seals a section of the tubular.

Aspects A, B, and C may have one or more of the following additional elements in combination: Element 1: wherein the tubular is a metal tubular. Element 2: wherein the tubular is a concrete tubular. Element 3: wherein the tubular is a polymeric tubular. Element 4: wherein the tubular has a sidewall thickness ($t_t$) and the sleeve of expandable metal has a sidewall thickness ($t_s$), and further wherein the sidewall thickness ($t_s$) is less than the sidewall thickness ($t_t$). Element 5: wherein the sidewall thickness ($t_s$) is at least 50% less than the sidewall thickness ($t_t$). Element 6: wherein the sleeve of expandable metal includes a first portion of expanded metal surrounding the leaking section, and a second portion of non-expanded metal radially inside of the first portion of expanded metal. Element 7: wherein a first volume of the first portion of expanded metal is less than a second volume of the second portion of non-expanded metal. Element 8: wherein the first volume of the first portion of expanded metal is no more than 50% of the second volume of the second portion of non-expanded metal. Element 9: further including a delay coating surrounding the sleeve of expandable metal, the delay coating configured to protect those surfaces of the sleeve of expandable metal not in contact with the tubular from encountering a reactive fluid. Element 10: wherein the sleeve of expandable metal is a collection of individual separate chunks of expandable metal held together with a binding agent. Element 11: wherein the surrounding medium is ground. Element 12: wherein the patch is located less than 150 meters below a surface of the ground. Element 13: wherein the patch is located less than 30 meters below a surface of the ground. Element 14: wherein the surrounding medium is water. Element 15: wherein the surrounding medium is air. Element 16: wherein the fluid line includes a first tubular section and a second tubular section forming a junction therebetween, and further wherein the sleeve of expandable metal surrounds the junction. Element 17: wherein the first tubular section and the second tubular section are within 10 degrees of parallel with one another, thereby forming a linear junction. Element 18: wherein the first tubular section and the second tubular section are greater than 20 degrees of parallel with one another, thereby forming a T-shaped junction or a Y-shaped junction. Element 19: further including detecting a leak in the leaking section of the tubular. Element 20: wherein the detecting occurs prior to the positioning the patch within the fluid line.

Those skilled in the art to which this application relates will appreciate that other and further additions, deletions, substitutions and modifications may be made to the described embodiments.

What is claimed is:

1. A patch for a fluid line, comprising:
a tubular; and
a sleeve of expandable metal positioned about the tubular, the sleeve of expandable metal comprising a metal configured to expand in response to hydrolysis and thereby seal a leaking section of a fluid line, wherein the sleeve of expandable metal includes a first portion of expanded metal surrounding the leaking section, and a second portion of non-expanded metal radially inside of the first portion of expanded metal.

2. The patch as recited in claim 1, wherein the tubular is a metal tubular.

3. The patch as recited in claim 1, wherein the tubular is a concrete tubular.

4. The patch as recited in claim 1, wherein the tubular is a polymeric tubular.

5. The patch as recited in claim 1, wherein the tubular has a sidewall thickness ($t_t$) and the sleeve of expandable metal has a sidewall thickness ($t_s$), and further wherein the sidewall thickness ($t_s$) is less than the sidewall thickness ($t_t$).

6. The patch as recited in claim 5, wherein the sidewall thickness ($t_s$) is at least 50% less than the sidewall thickness ($t_t$).

7. The patch as recited in claim 1, wherein a first volume of the first portion of expanded metal is less than a second volume of the second portion of non-expanded metal.

8. The patch as recited in claim 7, wherein the first volume of the first portion of expanded metal is no more than 50% of the second volume of the second portion of non-expanded metal.

9. The patch as recited in claim 1, further including a delay coating surrounding the sleeve of expandable metal, the delay coating configured to protect those surfaces of the sleeve of expandable metal not in contact with the tubular from encountering a reactive fluid.

10. The patch as recited in claim 1, wherein the sleeve of expandable metal is a collection of individual separate chunks of expandable metal held together with a binding agent.

11. A system, comprising:
a fluid line positioned within a surrounding medium; and
a patch positioned within the fluid line, the patch including;
a tubular; and
a sleeve of expanded metal positioned about the tubular, the sleeve of expanded metal comprising a metal that has expanded in response to hydrolysis to thereby seal a leaking section of the fluid line, wherein the sleeve of expandable metal includes a first portion of expanded metal surrounding the leaking section, and a second portion of non-expanded metal radially inside of the first portion of expanded metal.

12. The system as recited in claim 11, wherein the surrounding medium is ground.

13. The system as recited in claim 12, wherein the patch is located less than 150 meters below a surface of the ground.

14. The system as recited in claim 12, wherein the patch is located less than 30 meters below a surface of the ground.

15. The system as recited in claim 11, wherein the surrounding medium is water.

16. The system as recited in claim 11, wherein the surrounding medium is air.

17. The system as recited in claim 11, wherein the fluid line includes a first tubular section and a second tubular section forming a junction therebetween, and further wherein the sleeve of expandable metal surrounds the junction.

18. The system as recited in claim 17, wherein the first tubular section and the second tubular section are within 10 degrees of parallel with one another, thereby forming a linear junction.

19. The system as recited in claim 18, wherein the first tubular section and the second tubular section are greater than 20 degrees of parallel with one another, thereby forming a T-shaped junction or a Y-shaped junction.

20. A method for sealing a fluid line, comprising:
   providing a fluid line within a surrounding medium; and
   positioning a patch within the fluid line, the patch including;
      a tubular; and
      a sleeve of expandable metal positioned about the tubular, the sleeve of expandable metal comprising a metal configured to expand in response to hydrolysis, wherein the sleeve of expandable metal includes a first portion of expanded metal surrounding the leaking section, and a second portion of non-expanded metal radially inside of the first portion of expanded metal; and
   allowing reactive fluid passing through the fluid line to react with the first portion of expanded metal and expand to form an expanded metal portion that seals a section of the tubular.

21. The method as recited in claim 20, further including detecting a leak in the leaking section of the tubular.

22. The method as recited in claim 21, wherein the detecting occurs prior to the positioning the patch within the fluid line.

23. The method as recited in claim 20, wherein the surrounding medium is ground.

24. The method as recited in claim 20, wherein the surrounding medium is water.

* * * * *